(12) United States Patent
Huissoon

(10) Patent No.: US 10,669,694 B2
(45) Date of Patent: Jun. 2, 2020

(54) ELECTRIC DRIVE OF MOBILE APPARATUS

(71) Applicant: Hudson I.P. B.V., 's-Heer Arendskerke (NL)

(72) Inventor: Leendert Wilhelmus Cornelis Huissoon, 's-Heer Arendskerke (NL)

(73) Assignee: Hudson I.P. B.V., SC's-heer Arendskerke (NL)

( * ) Notice: Subject to any disclaimer, the term of this patent is extended or adjusted under 35 U.S.C. 154(b) by 57 days.

(21) Appl. No.: 15/830,698

(22) Filed: Dec. 4, 2017

(65) Prior Publication Data

US 2018/0106017 A1 Apr. 19, 2018

Related U.S. Application Data

(63) Continuation of application No. 15/027,942, filed as application No. PCT/NL2014/050689 on Oct. 6, 2014, now Pat. No. 9,845,587.

(30) Foreign Application Priority Data

Oct. 11, 2013 (NL) ...................................... 2011596

(51) Int. Cl.
*E02F 9/20* (2006.01)
*B60K 6/46* (2007.10)
(Continued)

(52) U.S. Cl.
CPC .............. *E02F 9/2058* (2013.01); *B60K 6/46* (2013.01); *B60K 25/02* (2013.01); *B60K 25/06* (2013.01);
(Continued)

(58) Field of Classification Search
CPC ... E02F 9/2058; E02F 9/18; E02F 9/22; E02F 3/308; E02F 3/32; E02F 9/2079; E02F 9/006; E02F 3/961; E02F 9/2091; E02F 9/0858; E02F 9/123; E02F 9/2095; E02F 9/2075; B60K 25/02; B60K 25/06; B60K 6/46; B60K 2025/026; Y10S 903/951; Y02T 10/6217; B60W 2300/17
See application file for complete search history.

(56) References Cited

U.S. PATENT DOCUMENTS 3,040,918 A * 6/1962 Schwartz .............. E02F 3/3483
414/720
4,679,336 A * 7/1987 Brocklebank ............. E02F 3/30
212/197
(Continued)

FOREIGN PATENT DOCUMENTS

EP 1199411 A1 4/2002
EP 2551163 A1 1/2013
(Continued)

*Primary Examiner* — Drew J Brown
(74) *Attorney, Agent, or Firm* — The Webb Law Firm

(57) ABSTRACT

A mobile apparatus includes a main frame, an operating arm connected to the main frame, drive means configured to drive displacing means of the mobile apparatus, such as one or more wheels or tracks, drive means configured to drive the operating arm and a control system, connected to operating instruments for a driver, for controlling the drive means. The drive means for the displacing means includes an electric motor such that the drive of the displacing means is substantially electrical.

19 Claims, 24 Drawing Sheets

(51) Int. Cl.
*E02F 3/30* (2006.01)
*E02F 3/32* (2006.01)
*E02F 3/96* (2006.01)
*E02F 9/00* (2006.01)
*E02F 9/08* (2006.01)
*E02F 9/12* (2006.01)
*B60K 25/02* (2006.01)
*B60K 25/06* (2006.01)
*E02F 9/18* (2006.01)
*E02F 9/22* (2006.01)

(52) U.S. Cl.
CPC ............... *E02F 3/308* (2013.01); *E02F 3/32* (2013.01); *E02F 3/961* (2013.01); *E02F 9/006* (2013.01); *E02F 9/0858* (2013.01); *E02F 9/123* (2013.01); *E02F 9/18* (2013.01); *E02F 9/2075* (2013.01); *E02F 9/2079* (2013.01); *E02F 9/2091* (2013.01); *E02F 9/2095* (2013.01); *E02F 9/22* (2013.01); *B60K 2025/026* (2013.01); *B60W 2300/17* (2013.01); *Y02T 10/6217* (2013.01); *Y10S 903/951* (2013.01)

(56) References Cited

U.S. PATENT DOCUMENTS

| | | |
|---|---|---|
| 6,199,307 B1 | 3/2001 | Kagoshima et al. |
| 8,547,055 B2 | 10/2013 | Mack |
| 9,845,587 B2 * | 12/2017 | Huissoon ................ B60K 6/46 |
| 2005/0274555 A1 | 12/2005 | Betz et al. |
| 2007/0049439 A1 | 3/2007 | Garnett |
| 2007/0080236 A1 | 4/2007 | Betz et al. |
| 2008/0121448 A1 | 5/2008 | Betz et al. |
| 2008/0229626 A1 | 9/2008 | Bertoni |
| 2009/0261761 A1 | 10/2009 | Yoshioka |
| 2010/0224426 A1 | 9/2010 | Shimada et al. |
| 2011/0174556 A1 | 7/2011 | Hermann et al. |
| 2012/0222833 A1 | 9/2012 | Vikstrom et al. |
| 2012/0247846 A1 * | 10/2012 | Ichikawa ............ B60H 1/00207 180/65.21 |
| 2013/0006451 A1 * | 1/2013 | Cooper ................. B61L 3/006 701/19 |
| 2013/0074525 A1 | 3/2013 | Johnston et al. |
| 2013/0075171 A1 | 3/2013 | Noguchi et al. |
| 2013/0153317 A1 | 6/2013 | Rawlinson et al. |
| 2013/0218386 A1 * | 8/2013 | Fisker ..................... B60K 6/46 701/22 |
| 2013/0218423 A1 | 8/2013 | Colwell et al. |
| 2013/0325235 A1 | 12/2013 | Kurikuma et al. |
| 2014/0188321 A1 | 7/2014 | Ishida et al. |
| 2014/0223893 A1 | 8/2014 | Peterson et al. |
| 2014/0227104 A1 | 8/2014 | Takahashi et al. |
| 2016/0023621 A1 | 1/2016 | Books et al. |
| 2016/0097405 A1 | 4/2016 | Hoshino et al. |

FOREIGN PATENT DOCUMENTS

| | | |
|---|---|---|
| EP | 2578756 A1 | 4/2013 |
| GB | 2493961 A | 2/2013 |
| NL | 1035694 C2 | 1/2010 |
| WO | 2007040820 A1 | 4/2007 |
| WO | 2008042319 A2 | 4/2008 |
| WO | 2008107685 A1 | 9/2008 |
| WO | 2012160407 A1 | 11/2012 |
| WO | 2013066926 A1 | 5/2013 |

* cited by examiner

ELECTRIC DRIVE OF MOBILE APPARATUS

CROSS REFERENCE TO RELATED APPLICATIONS

This application is a continuation of U.S. patent application Ser. No. 15/027,942, filed on Apr. 7, 2016, which is a United States national phase of International Application No. PCT/NL2014/050689 filed Oct. 6, 2014, and claims priority to Netherlands Patent Application No. 2011596 filed Oct. 11, 2013, the disclosures of which are hereby incorporated in their entirety by reference.

BACKGROUND OF THE INVENTION

Field of the Invention

The present invention relates to a mobile apparatus with an operating arm, such as for instance tractors, excavators, wheel loaders, arm mowers, rotating telescopic cranes, compact trucks with a crane, or combinations thereof. The invention relates more specifically to a mobile apparatus comprising a main frame, an operating arm connected to the main frame, drive means configured to drive displacing means of the mobile apparatus, such as one or more wheels and/or one or more caterpillar tracks, drive means configured to drive the operating arm and a control system, connected to operating instruments for a driver, for controlling the drive means.

Description of Related Art

Excavators are known which have only a main frame or a rotatable sub-frame and telescopic cranes on a rotatable sub-frame. Both types of machine can be provided with motor(s) for the drive which are placed in the main frame or in the rotatable sub-frame, wherein a combustion engine provides for driving of a hydraulic pump. These one or more pump(s) provide(s) the operating arm and components thereof with energy.

Described in EP 1199411 of Kobelco Construction Machinery Co. Ltd. is a hybrid electric excavator, wherein the hydraulic pump in the rotatable sub-frame also provides energy to the caterpillar tracks in the main frame for displacement purposes. EP 2578756A1 of Hitachi describes a compact excavator equipped with a parallel hybrid drive. The same type of hybrid system, wherein a hydraulic drive drives the wheels of a mobile work platform, is described in WO2008/107685 in the name of Niftylift Limited.

EP 2551163 in the name of Hitachi Construction Machinery describes so-called hybrid wheel loaders or loading shovels. Such a solution has a main frame in or on which all components are mounted.

Agricultural tractors are known with electric drive of the wheels and power takeoff shafts, such as for instance the electric Rigitrac and the John Deere 7030 Series E-Premium. GB2493961 in the name of the Agco Group describes a partially electrical power takeoff shaft on a tractor.

Stated in NL1035694 in the name of applicant is that different solutions of an electrical or hybrid system are possible in a combination of a main frame and a rotatable sub-frame.

Also known as are electrically driven passenger vehicles as such, such as the Tesla Model S and Model X, Nissan Leaf or BMW i3, which are driven purely electrically. There are also serial hybrid or parallel hybrid vehicles. Examples hereof are the Toyota Prius, Honda Civic Hybrid, the Ford Escape Hybrid and so on. So-called range extenders are also being used more often in the automobile industry. This form uses a small combustion engine to charge the battery. These vehicles can also be charged from a mains electricity supply or other power supply, such as solar panels or quick chargers. Examples hereof are the Chevrolet Volt Plug-in, Fisker Karma, BMW i3 or BMW i8 plug-in with range extender. These vehicles have an electrical and battery system optimized in respect of component architecture, efficiency, cooling, and having a low centre of gravity. These components are constructed in large numbers, making them very well-tested and optimized systems and relatively inexpensive.

Battery packs, and particularly the cooling, heating and conditioning thereof, are shown in US 2011/0174556 A1, US 2012/0222833 A1, US 2013/0074525 A1 and US 2013/0153317 in the name of Tesla Motors. WO 2013/066926 A1 in the name of Brammo Inc. describes batteries for electric motorbikes. Building or connecting such a battery system into or to a vehicle is shown in US 2011/0174556 A1 in the name of Tesla Motors and in WO 2012/160407 A1 in the name of Better Place GmbH.

The above stated optimization and design detail of electric driving in the vehicle prior art relates to machines, vehicles or motorbikes with one function, either a function as tractor, as excavator, as loading shovel or as vehicle for transporting persons and/or freight.

SUMMARY OF THE INVENTION

It is therefore an object of the present invention, among others, to provide an energy-efficient, versatile and/or improved mobile apparatus.

The mobile apparatus has the special feature that the drive means for the displacing means comprise an electric motor such that the drive of the displacing means is substantially electrical.

The present invention is distinguished from the prior art in that it realizes a substantially electrical, preferably solely electrical drive for driving one or more wheels or one or more caterpillar tracks for displacing the frame. The drive and movement of an operating at it can be effected using hydraulics, wherein a hydraulic pump can be provided with a drive embodied as electric motor. The movable operating arm can for instance operate in a folded-out articulated position and operate as folded-together single lifting arm. A further embodiment makes use of electrical energy to firstly drive an implement on the operating min and secondly to possibly also bring about the operating arm movements with electrical energy, optionally via hydraulics.

It is particularly advantageous for multiple consuming devices, i.e. actuators for supplying energy, to be driven by more than one electric motor. This also makes it more complex, since multiple consuming devices may require cooling and control management. This can be controlled by the control system, for instance by a computer or computing unit.

It is moreover advantageous for an energy-efficient electrical system to be provided which is optimized so as to reduce the energy demand required by the different drives. In EP 1199411 of Kobelco Construction Machinery Co. as stated above the driving for the caterpillar tracks takes place by means of hydraulics. The efficiency thereof is never greater than 80%. The efficiency of an electric drive for displacement/travel can be between 90% and 95%. As the travelled distances become greater and the speed increases, the energy saving becomes proportionally greater. Another advantage of electrical driving—and so the present invention—is that from standstill it is possible to accelerate up to about 150 km/h in continuously variable manner with large moment of torque and without changing gear. This is not possible mechanically or hydraulically.

The one or more electric motors for the tyres or caterpillar tracks can, if built in, also provide for recovery of braking energy, which in turn provides energy savings. More specifically, at least one electric motor for the drive of the displacing means then has a braking energy recovery system configured to return energy to an energy storage unit. It is also advantageous for the braking system and/or the steering system of the mobile apparatus to be driven directly or indirectly or be partially actuated by a separate electric motor or an electric actuator, which is preferably controlled by the control system.

Electric travel is also possible while an implement connected to the main frame or to the operating arm is switched on. This increases the comfort of the driver. The accuracy of positioning of such a machine with an operating arm in compact spaces is also better than with a hydraulic or mechanical drive.

According to a further preferred embodiment, the mobile apparatus is configured for the use of implements on the operating arm. The mobile apparatus preferably also comprises a lifting device which can also be employed as stabilizing device. The operating arm and/or the lifting device can comprise electric actuators for driving thereof, wherein the actuators are configured to be controlled with the control system.

According to a further preferred embodiment, at least one lifting device is therefore arranged on the main frame for the purpose of coupling implements, or a stabilizing device is arranged, wherein the lifting device is provided with a drive embodied as electric motor and configured to be controlled via the control system. The lifting device can comprise a three-point lifting device for coupling of implements or a stabilizing device.

It is also possible to couple implements to the main frame via the lifting device. These implements require the availability of a high peak capacity, such as in the case of a grass (flail) mower on the operating arm or a wood chipper, or when travelling uphill. This peak capacity is not necessary most of the time, for instance when only travelling over a flat surface or during excavation or loading shovel operations. An implement coupled to the operating arm or an implement on a lifting device on the main frame can be driven electrically by means of energy from either an energy storage unit, a generator or a fuel cell.

According to the prior art a combustion engine should be able to provide this peak capacity. Such a combustion engine is however large, complex due to the emission-reducing chemical treatment of the exhaust gases, and also expensive. In the case of an electric drive for these applications the more than average demand for motor power is supported more easily by the electric drive because of the large torque. When there is sufficient energy in an energy storage provision, such as a battery, capacitor or other forms of storage, this demand can be met more easily and with a higher efficiency.

A hydraulic pump for driving an implement on the operating arm or on the main frame cannot be switched off completely when the energy is not being demanded because in the present prior art it is mechanically coupled to a combustion engine. The combustion engine has to run at all times at a minimum stationary rotation speed and also for cooling, power-assisted braking and power-assisted steering. The present invention can optionally control separate electric motors or a single, larger electric motor at a very low power and rotation speed, and thereby consumption, so that only the necessary systems are supplied with energy. An even lower energy consumption is hereby possible, for instance when just travelling without the implement or operating arm being switched on. Another option is to move only the operating arm via a motor and not to use travel drive.

It is also advantageous for the consuming devices, i.e. the drives, to be of the same type and optionally power, and also to be controlled by the same type of controller and supplied with power by the same type of inverter/converter. This makes it easy to interchange components. It is more specifically advantageous for at least two drives to be formed by two substantially identical electric motors.

It is also recommended for at least two drives to be formed by two electric motors comprising at least an identical control and identical mounting means for mounting the motors in the mobile unit. At least two controllers for two drives can also be identical for the purpose of the interchangeability and easy replaceability. At least two inverters/converters for the two drives are preferably also identical.

The present invention is further distinguished by the option of a hybrid solution, also referred to as range extender, for all energy-demanding applications, so as well as for travel/displacement, driving of implements, moving of the arm or a synchronous combination thereof. The invention takes the required peak capacity from the energy storage, for instance a battery or batteries or capacitors, and this is charged by a combustion engine via a generator or a fuel cell system.

A preferred embodiment of a mobile apparatus according to the invention therefore also comprises a generator which is operatively connected to an energy storage unit and a combustion engine operatively connected to the generator, wherein the combustion engine and generator are configured to supply electrical energy to the energy storage unit.

For direct supply of electrical energy to the drive, at least one of the drives embodied as electric motor can be operatively connected to a generator which is operatively connected to a combustion engine, wherein the combustion engine and generator are configured to supply electrical energy to the drive.

In the case of a combustion engine, this can supply energy at an ideal—high-efficiency-rotation speed. An additional advantage of the invention is that less sound is produced by the combustion engine than in the case of an engine of greater power. The required emission treatment of the exhaust gases is less complex and requires less cooling power, whereby the resulting overall difference in efficiency is even more favourable. The range extender can also supply energy directly to a generator, whereby the total peak capacity to the different electric motors or actuators is generated by the combustion engine supplemented with energy from an energy storage unit.

At least the drive for the displacing means embodied as electric motor can for this purpose be operatively connected to both an energy storage unit and a generator, wherein the electrical energy is supplied to this electric motor by the generator and simultaneously by the energy storage unit.

A possible embodiment is that the combustion engine is coupled in parallel and mechanically to the generator and for instance also to a hydraulic or air pump. This connection can be fixed (parallel mild hybrid) and the generator thus always co-rotates with the combustion engine and for instance a pump. It can also be connected releasably, for instance by a coupling, whereby the generator becomes a motor and thereby supplies energy from a storage unit to the pump while the combustion engine is switched off, a so-called parallel full-hybrid. In the case of a mechanical connection between generator/motor and a hydraulic or air pump the generator—which is then a motor—can supply energy via a pump. The generator/motor is then supplied with power by an energy storage unit.

It is possible for this purpose for at least one of the drives embodied as electric motor to also be configured to function as generator, wherein a combustion engine is connected to the electric motor using a connectable and disconnectable coupling.

Another embodiment is the so-called serial-hybrid, wherein there is no mechanical connection between generator and for instance a pump, but there is always a mechanical connection between combustion engine and generator. It is hereby always possible to supply energy from an energy storage unit to an electrical consuming device without a running combustion engine. It is thus possible to travel—owing to the electrical drive on the displacing means—while, in the case of a combustion engine, this engine is not running.

It is particularly advantageous for the mobile apparatus to be able to operate or travel purely electrically—and without emission—while the combustion engine is not running. The control system can then be configured to switch off the combustion engine as a response to input of an electrical mode by the driver via the operating instruments. In nature reserves or urban areas and residential areas this is desired more often, and sometimes even required by local authorities. This is also the case for possible leakage of liquids such as hydraulic oil. The more electric motors/consuming devices, the less leakage compared to hydraulic consuming devices.

In the case of a generator, this can be driven by a combustion engine. This can be a diesel engine, a petrol engine, a gas engine or other type of engine.

It is particularly advantageous for the control system to be a bus system. Maximum use can hereby be made of the available energy in optionally more than one energy storage unit at different locations. In the case of an implement on the main frame demanding energy at the same time as an implement on the operating arm, the energy demand can be regulated using this system. The control system or the bus system preferably controls at least one controller for the at least one drive embodied as electric motor. The operating instruments can be coupled here to a computing/computer unit, wherein the computing unit is configured to compute the extent to which one—or a combination—of the drives is controlled via the control system or the bus system.

Another advantage is the architecture of the components, the so-called packaging. The invention makes it geometrically possible to incorporate above stated standard automotive energy storage units, capacitors and battery systems in the frame. It is then advantageous that at least one energy storage unit can be coupled to the main frame via the front, the rear or the side and/or that at least one energy storage unit can be coupled to the main frame via the upper or underside. It is moreover possible that at least one energy storage unit can he coupled for this purpose to the rotatable sub-frame via the rear side of the sub-frame. It is moreover advantageous for at least one energy storage unit to be spring-mounted.

Particularly advantageous is the use of the mass of the energy storage unit as counterweight in a rotating sub-frame or for the purpose of lowering the centre of gravity of the main frame. The plugin character is also innovative. The mobile apparatus can also be charged by a standard mains electricity supply or special high-capacity chargers outside the mobile apparatus, whereby the charging time is shortened. This can also be an induction system over it is possible to park or travel. An energy storage unit can for this purpose be charged via a charger by an energy source outside the mobile apparatus. This can also be an energy source which can be carried or pulled along by the mobile apparatus. In such a situation it is advantageous to have the connection of the charger on the rear side of the main frame at the coupling of the pulled energy source.

The mobile apparatus has a main frame with one or more displacing means, such as one or more tyres or one or more caterpillar tracks or a combination thereof, and preferably having thereon a location for a driver and an operating arm for lifting and displacing loads or coupling implements, such as for excavation work, crane operations, mowing operations, loading shovel operations, or implements for combatting icy conditions, for forestry or for golf course maintenance. In addition to the operating arm, the mobile apparatus preferably also has one or more additional lifting devices to which can be coupled implements such as a wood chipper, a ground cutter, a salt-spreader, a grass mower, a pallet fork, a stabilizer shield. Many other implements for forestry or agriculture, construction or for landscape management can be coupled via a lifting device to the front side or rear side of the main frame. The type of lifting device for coupling an implement can be random, but for instance also the known three-point lifting device.

The mobile apparatus can consist solely of a main frame on which the location for a driver is fixedly mounted. In a further embodiment it can also be the case that the driver can rotate in a location/cab relative to the main frame. This location/cab can be arranged on a sub-frame.

Another embodiment is that a rotatable sub-frame with a workplace or cab for the driver and at least one or more operating arms on the sub-frame is connected to a main frame, usually via a vertical or substantially vertical shaft. A preferred embodiment of a mobile apparatus more specifically comprises a sub-frame arranged rotatably relative to the main frame, wherein the rotatable sub-frame comprises the operating instruments for the driver. The sub-frame can rotate partially or completely through 360 degrees without limit.

In order to limit the transfer of energy it is advantageous for the drive and the energy storage unit of an actuator which is arranged in a frame to also be arranged in that frame. As stated, the operating arm is preferably arranged on the sub-frame, wherein the drive of the operating arm is arranged in the sub-frame. An energy storage unit in the sub-frame can then be arranged as counterweight. The energy storage unit for the drive of the operating arm is more preferably arranged in or on the sub-frame.

All embodiments have in common that the displacing means are driven by one or more electric motors. Electrical energy for these and other components comes for instance from an energy storage unit such as a battery or a capacitor. The energy can also come from a generator or a fuel cell. These components can be positioned in the main frame or in or on a rotating location of a driver or in or on a rotating sub-frame. It can also be the case in an embodiment that some of the components are positioned in the main frame, some at the cab or some in or on the rotating sub-frame, or another combination.

Since the displacing means are preferably arranged on the main frame, the drive of the displacing means is also arranged in or on the main frame. It is then moreover advantageous for at least one energy storage unit for supplying energy to the at least one electric motor for the displacing means to be arranged in or on the main frame.

The energy storage units can however also be distributed over the frames. It is for instance possible for at least one energy storage unit to be positioned in the main frame and at least one energy storage unit in the sub-frame, wherein they are connected to a drive embodied as electric motor so that the electric motor can be supplied with power from a combination of energy storage units. In the case there is insufficient capacity in the one storage, the supply of energy can still take place from the other energy storage unit.

The distribution of other components is also flexible. It is possible for at least one generator or at least one fuel cell system to be placed in the main frame. It is also possible for at least one generator or at least one fuel cell system to be placed in the rotatable sub-frame.

Different forms of energy are distinguished in the mobile apparatus. Electrical energy can come from an energy storage unit or from a generator or from a fuel cell. Hydraulic energy for instance comes from a hydraulic pump. Pneumatic energy will then come from a compressor or pump. A mechanical energy comes for instance from a rotating shaft. These possible media, and thus energy flows, provide for the movement of an operating arm, a lifting device, a power takeoff shaft or implement or a part of an implement on a lifting device or an implement on an operating arm, so-called consuming devices.

A preferred embodiment comprises for this purpose a plurality of drives for driving actuators, i.e. consuming devices, for supplying energy, such as a hydraulic pump, a pneumatic pump or a rotating shaft, wherein each of the drives is embodied as electric motor. The different consuming devices can then be controlled in simple manner when each drive is configured to be controlled via the control system.

A mobile apparatus preferably comprises at least two energy storage units for supplying energy to at least two of the drives. Each of the drives is however more preferably provided with its own energy storage unit. The transport of electrical energy through the mobile apparatus is hereby limited.

An embodiment always has electric driving for one or more tyres or one or more caterpillar tracks on the main frame. It is possible here for the drive means for the displacing means, embodied as at least an electric motor, to directly drive the displacing means. Each wheel, or a number of wheels, can then be provided with its own electric motor with suitable control via the control system. It is however also possible for at least one of the drives, including that for the displacing means, to be provided with a suitable transmission.

A further embodiment is a takeoff shaft (also) driven directly by a combustion engine or by a hydraulic motor. A lifting device can serve as stabilizing device so as to obtain a more stable mobile apparatus during loading shovel or excavation work or crane operations.

It is characteristic for the driver to control the driving of one or more consuming devices or drives via the control system via operating instruments at the driver location.

A consuming device can be an electric motor for the drive of the displacing means, an electric motor for driving a power takeoff shaft, a hydraulic valve for controlling an operating arm, an electric motor for a hydraulic pump, an electric motor for controlling the rotation of a sub-frame or an implement on the operating arm or on a lifting device.

It is possible that the rotation of the sub-frame relative to the main frame is driven by an electric motor controlled by the operating instruments via the control system. More specifically, the sub-frame is preferably rotatable relative to the main frame by means of an electric motor configured to be controlled by the operating instruments via the control system.

The skilled person will appreciate that operating instruments on the sub-frame can be a computer screen or display or a panel or a number of buttons, or can be one or more joysticks or a combination thereof which transmits the commands entered by the driver, optionally via a computing unit/computer, as signals to the control system.

Components which transmit the different commands from the control system to for instance an electric motor or a hydraulic or pneumatic valve or an implement on the lifting device are for instance so-called controllers or I/O units or interfaces or ECUs, which control and convert the command signals via different components into mechanical, hydraulic, electrical, pneumatic energy or combinations thereof, but at least electrical energy to the electric motors for displacing of the mobile apparatus.

Components which convert alternating current into direct current and vice versa can be so-called inverters or converters. The energy in a storage unit is usually of the direct current type. Most consuming devices in the form of electric motors or actuators are often of the alternating current type.

In a further embodiment these consuming devices also have sensors, and the information therefrom is transmitted via the control system to a computing unit. This can also be the status of an energy storage unit, of a generator, of a combustion engine or of a fuel cell. The input is used to calculate for instance the available capacity of the generator or of the energy storage unit, the power required for a consuming device, torque required for a consuming device, required cooling temperature of a consuming device, required range in kilometres or consumption per unit time and associated consumption in a determined period of time. It is more specifically advantageous for at least one of the drives to be provided with a sensor for detecting the status of the drive, wherein the computing 5 unit is configured to control the drive on the basis of the input of the sensor and the operating instruments.

An embodiment is possible wherein an energy storage unit and a generator or a fuel cell both supply energy to one or more consuming devices.

According to a preferred embodiment, it is possible for an energy storage unit to provide at least an electric motor with power for the drive of the displacing means. This storage unit can be positioned in or on the main frame or outside this main frame. This energy storage unit can thus also he in or at a rotating location for a driver or in or on a rotating sub-frame.

According to a further preferred embodiment, multiple consuming devices are provided with power by one and the same energy storage unit. It is moreover possible that there is more than one energy storage unit and that these provide a consuming device separately with electricity. An alternative is that there are more energy storage units which are connected in order to provide one or more consuming devices with energy.

According to different embodiments, electrical energy can be transferred between the rotatable sub-frame and the main frame and vice versa by a so-called slip ring or rotary joint. According to a further preferred embodiment, the mobile apparatus more specifically comprises for this purpose a rotary joint (slip ring) between the main frame and the rotatable sub-frame configured to feed electrical energy for the at least one drive between the main frame and the rotatable sub-frame. The transmission of the command signals between main frame and sub-frame can also take place here via a slip ring or rotary joint with for instance slide contacts or contacts with a liquid metal.

A further embodiment provides for transfer of the command signals between main frame and sub-frame via a contactless wireless connection, such as for instance radiographically or via Bluetooth.

An embodiment has the control and feedback via the control system of the energy source, such as for instance combustion engine or other type of motor or energy source.

An embodiment is possible wherein the driver enters commands via a remote control system, wherein these are transferred via an antenna and data transmitter to the control system for the purpose of controlling the mobile apparatus, and particularly controlling one or more electric motors for driving one or more tyres or one or more caterpillar tracks. The antenna or data transmitter can be placed here in the sub-frame or in the main frame.

A further embodiment provides for control of more than one energy flow to a lifting device. A flow of energy thus provides for the up and downward movement of the lifting device and another flow of energy can thus provide for the adjustment of the angle of the lifting device, such as for instance adjustment of the angle of a three-point lifting device or the angle of a quick change system on the lifting device.

There can be different embodiments of a control system. For instance a Can-Bus system of different protocols such as .T1 939, Flex Ray, Isobus or other types. This can also be a glass fibre system. A control system is also understood to mean that electrical or digital signals are transmitted from a component to another component in order to transfer data whereby a consuming device is controlled or feedback data return from one component to another component. A computing unit or computer unit or a processor is a component which can transmit and receive command signals from for instance a controller, an inverter or converter, an electric motor or an electric actuator.

Another further embodiment provides for entry of a priority by the driver via the operating instruments. Priority can be given to the change in the travel speed or the travel power of the whole mobile apparatus, or priority to the implement in a lifting device on the main frame, or priority to an implement on the operating arm. The computing unit provides for transmission of the energy requirement to the different components via the control system. It is then more specifically advantageous for the control system to be configured to distribute the available electrical energy over the plurality of drives on the basis of priorities of the drives entered by the driver with the operating instruments.

The driver can choose the priority setting subject to the working mode. In the case of travel alone, the priority lies with the control of one or more electric motors for the displacing means. In the case of excavation work or crane operations the priority lies with movement of the operating arm. In the case of loading shovel operations it lies with both the arm and the travel. During functioning as tractor it lies with both the power takeoff shaft and the travel. And when an implement is employed on the arm and an implement on the lifting device it lies with these, and less with the travel. The computing unit determines which energy goes to which consuming device and also determines whether the generator or the fuel cell is switched on.

In the case of silent mode or purely electrical mode, so without combustion engine running, the computing unit can also determine that the consuming devices are allowed less energy in order to increase the operating time. This energy management can for instance also be used to reduce consumption. The driver can preferably set an energy-saving mode.

As noted above, the electric motors of the different consuming devices are preferably identical. This is also the case for the inverters/converters and the controllers or I/O or ECUs. It is possible that 75% of these components are identical. An example is for instance that an electric motor for the drive of the displacing means and an electric motor for a power takeoff shaft or an electric motor for a pump are identical. This can also be the case for the controllers and inverters thereof.

There are possibilities for a gearbox, planetary system, a differential or other type of transmission to be connected between an electric motor as consuming device and a takeoff shaft, pump, tyres or caterpillar tracks.

The operating instruments can also reverse the direction of rotation of an electric motor on a power takeoff shaft in simple manner for the correct combination of implement and the travel direction of the mobile apparatus. The direction of rotation of the electric motor for driving at least a power takeoff shaft can for this purpose be adjustable, depending for instance on a chosen travel direction of the mobile apparatus and/or the coupled implement.

Energy storage units can also be spring-mounted and mounted for damping in order to ensure that an off-road application is suitable for the energy storage unit such as battery or capacitor. At least one energy storage unit preferably has a cooling or a heating. The cooling of the at least one energy storage unit can take place by means of a liquid or water, or by means of air. An external pump or fan can be used for this purpose.

BRIEF DESCRIPTION OF THE DRAWINGS

The above stated and other advantageous features and objects of the invention will become more apparent, and the invention better understood, on the basis of the following detailed description when read in combination with the accompanying drawings, in which.

DESCRIPTION OF THE INVENTION

Figure 1:
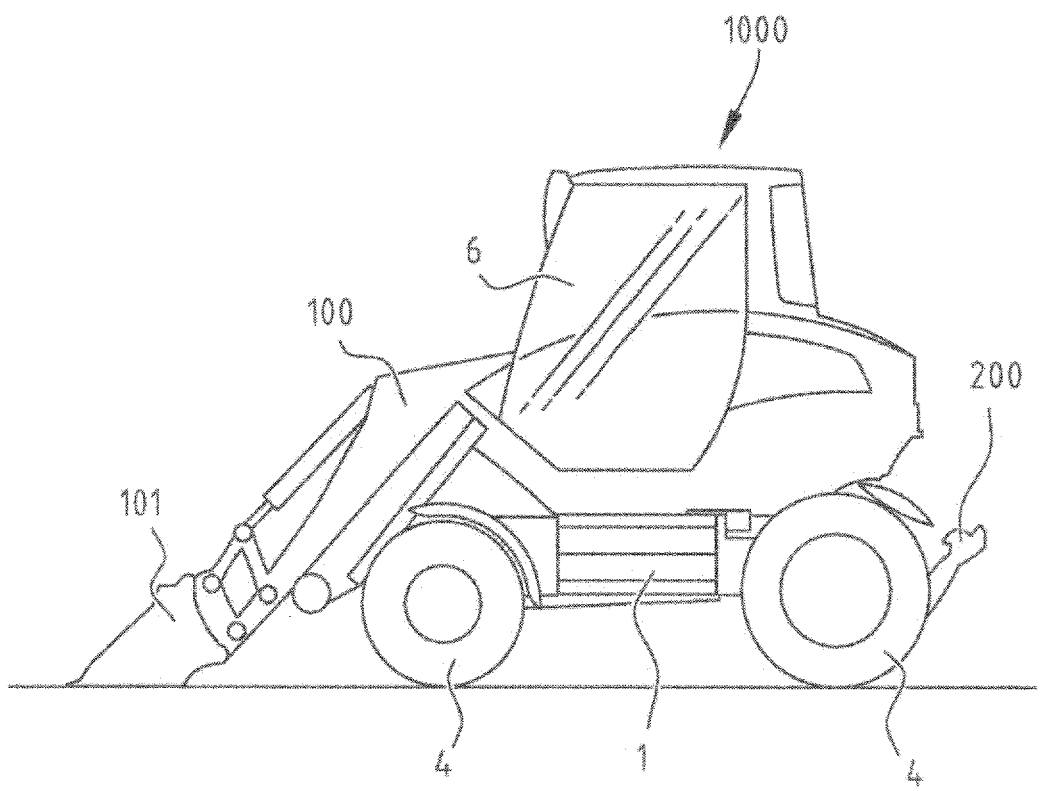
FIGS. 1-5 show schematic side and front views of different embodiments of the mobile apparatus according to the invention.

FIG. 1 shows a mobile apparatus 1000 provided with main frame 1 on which wheels 4 are arranged. A location 6 for the driver in the form of a cab is arranged on main frame 1. Cab 6 is rotatable to limited extent relative to main frame 1. Also arranged on main frame 1 is an operating arm 100 with an implement 101. Main frame 1 is moreover provided with a lifting device 200 to which additional implements (not shown) can be coupled.

Figure 2:
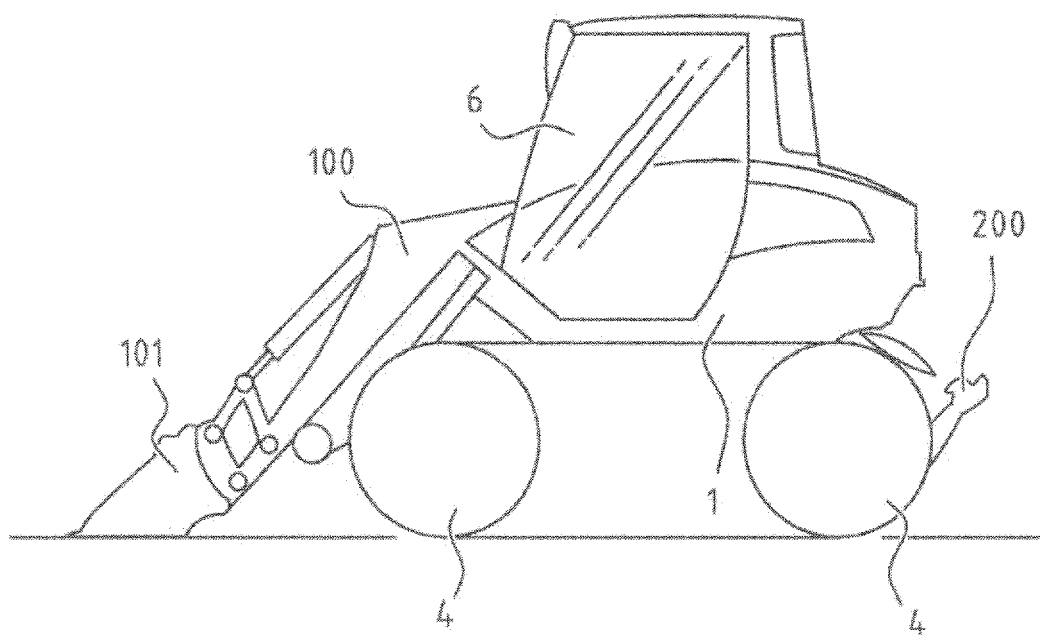
Figure 3:
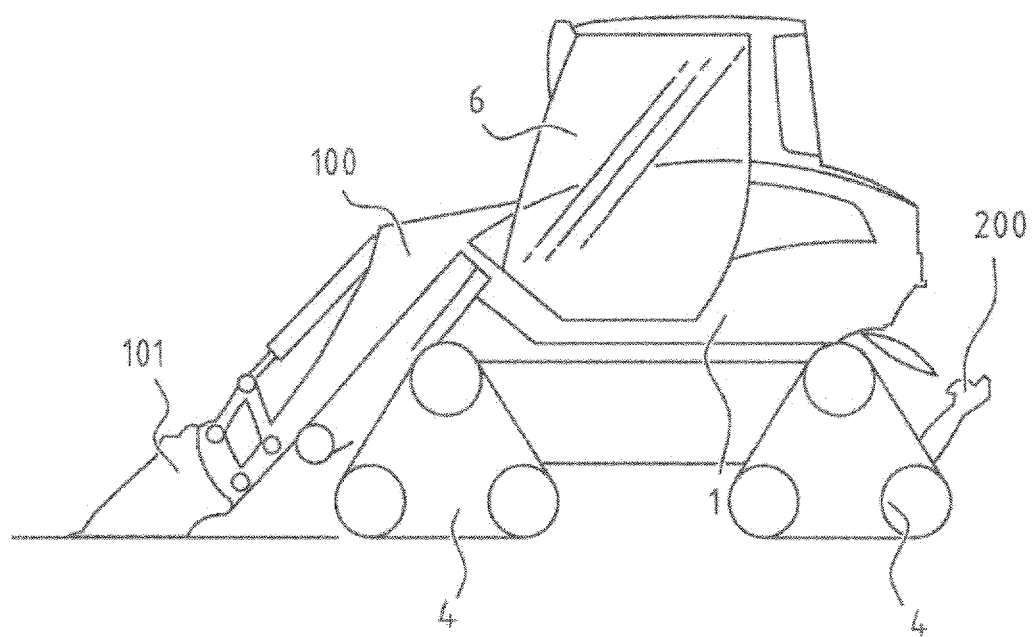

In the embodiment of FIG. 2 caterpillar tracks 4 are arranged on the main frame as displacing means instead of wheels. FIG. 3 shows a variant of a mobile apparatus provided with caterpillar tracks.

Figure 4:
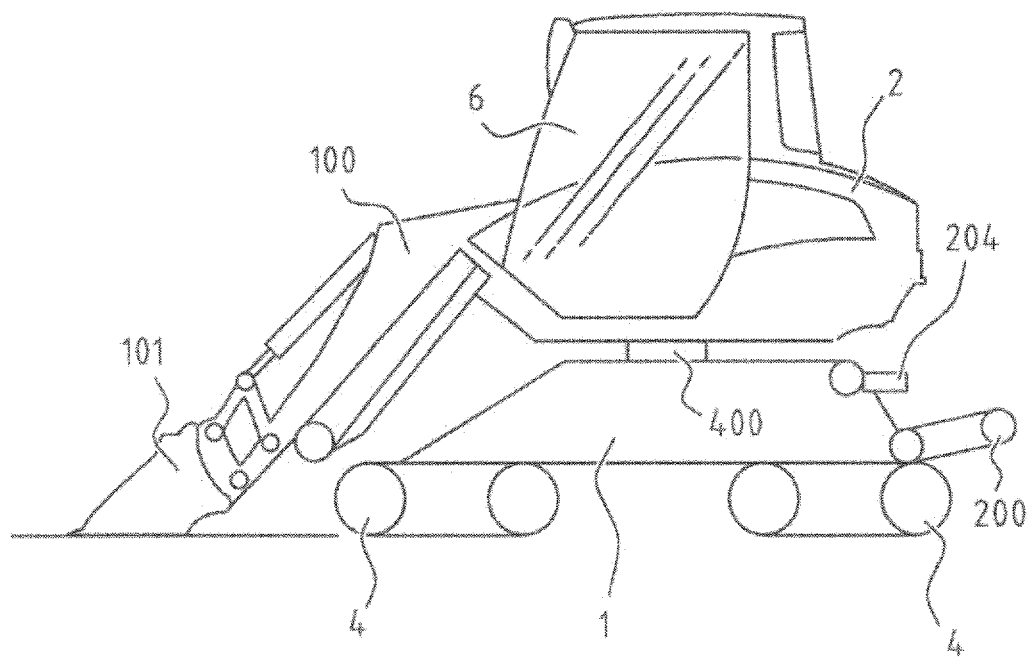

The embodiment in FIG. 4 is provided with a sub-frame 2 which is infinitely rotatable relative to main frame 1 by means of slip ring 400. The apparatus can comprise for this purpose an electric motor with suitable control, as will be described in more detail below. Cab 6 and operating arm 100 with implement 101 are arranged on sub-frame 2 and can thereby also rotate infinitely relative to main frame 1. Main frame 1 is also provided in this embodiment with a power takeoff shaft 204.

Figure 5:
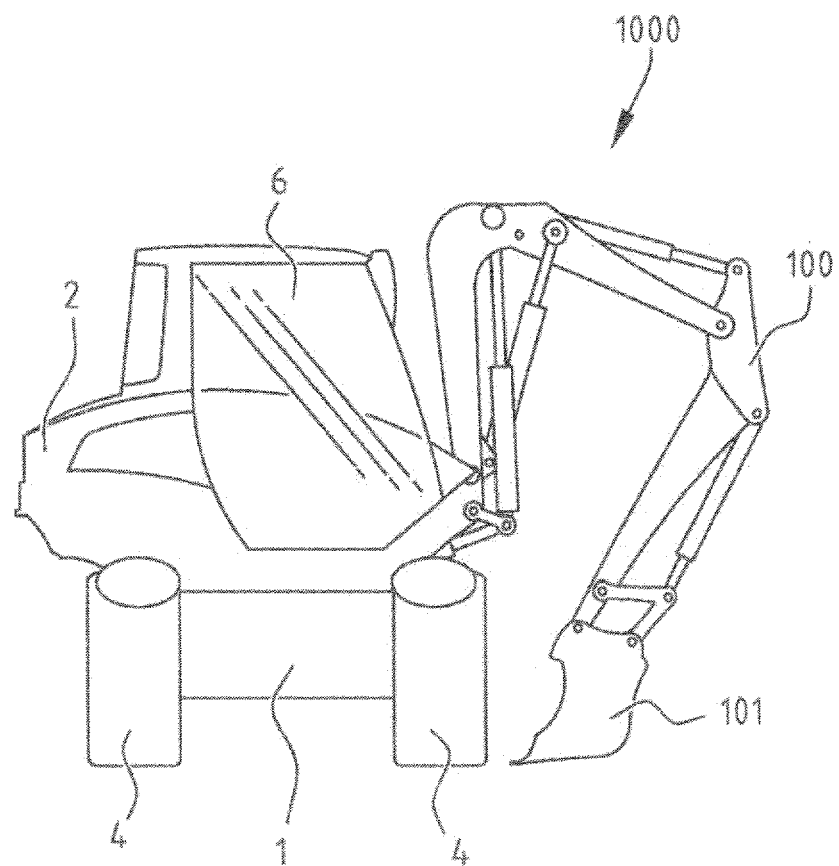

FIG. 5 shows a front view of a mobile apparatus 1000, wherein sub-frame 2 is rotated relative to main frame 1. In this embodiment operating arm 100 is an articulated operating arm provided with an implement 101 for excavating.

The construction of the different components of a mobile apparatus is described schematically in more detail in the following figures. It will be apparent that, when reference is for instance made to wheels 4 in the context of these figures, these can equally well be replaced by the caterpillar tracks as shown in FIGS. 2-4.

Figure 6:
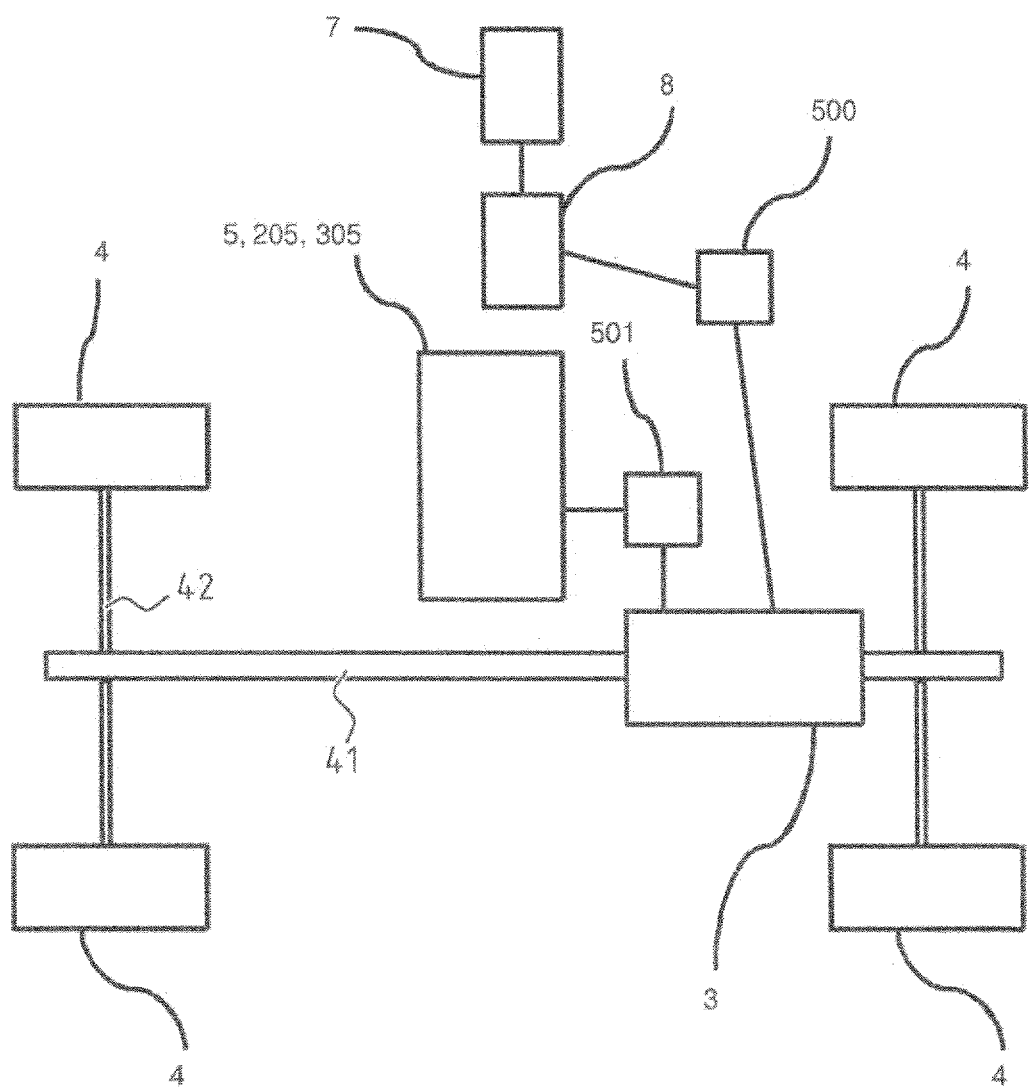
FIGS. 6-16 show block diagrams of different embodiments of the mobile apparatus according to the invention.

With reference to FIG. 6, the driving of displacing means 4, in this variant in the form of wheels 4, takes place using an electric motor 3. Motor 3 drives a main drive shaft 41 which drives wheels 4 via suitable differentials and drive shafts 42. Electric motor 3 is electrically coupled to an energy storage in the form of a battery 5. In this embodiment, battery 5 is coupled via an inverter 501 to electric motor 3. Control of electric motor 3 takes place via a command system 8. The driver or user of the mobile unit can give instructions to command system 8, for instance for the control of 35 the drive means of displacing means 4, via operating instruments 7. In this embodiment operating instruments 7 are arranged in the cab of a mobile apparatus. Command system 8 can optionally be coupled via a controller 500 to electric motor 3, wherein the controller is configured to convert the control signals of command system 8 to suitable control signals for electric motor 3.

Figure 7:
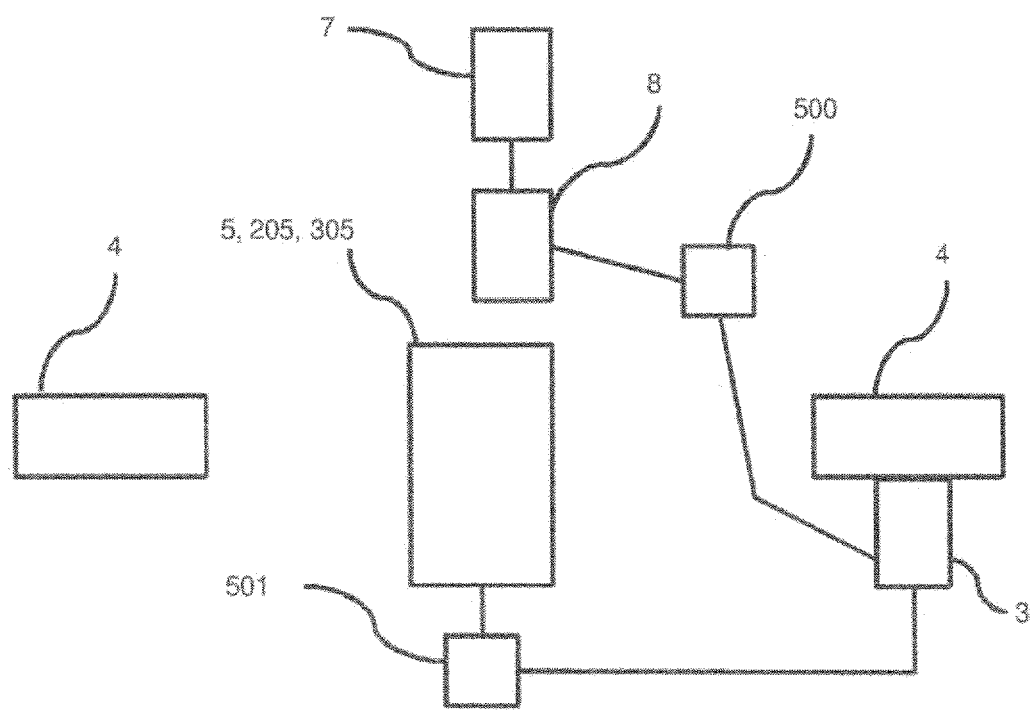

The embodiment as shown in FIG. 7 differs from that of FIG. 6 in respect of the drive of displacing means 4. In this embodiment, displacing means 4 are driven directly by an electric motor 3. Electric motor 3 is more specifically arranged directly on the shaft of a wheel 4. Although only one wheel 4 is provided with a drive in this embodiment, it will be apparent that each of the wheels can be provided with such a drive in the form of an electric motor 3, wherein each of these motors is connected to a or the battery 5 and command system 8, optionally via controllers 500, for control thereof.

Figure 8:
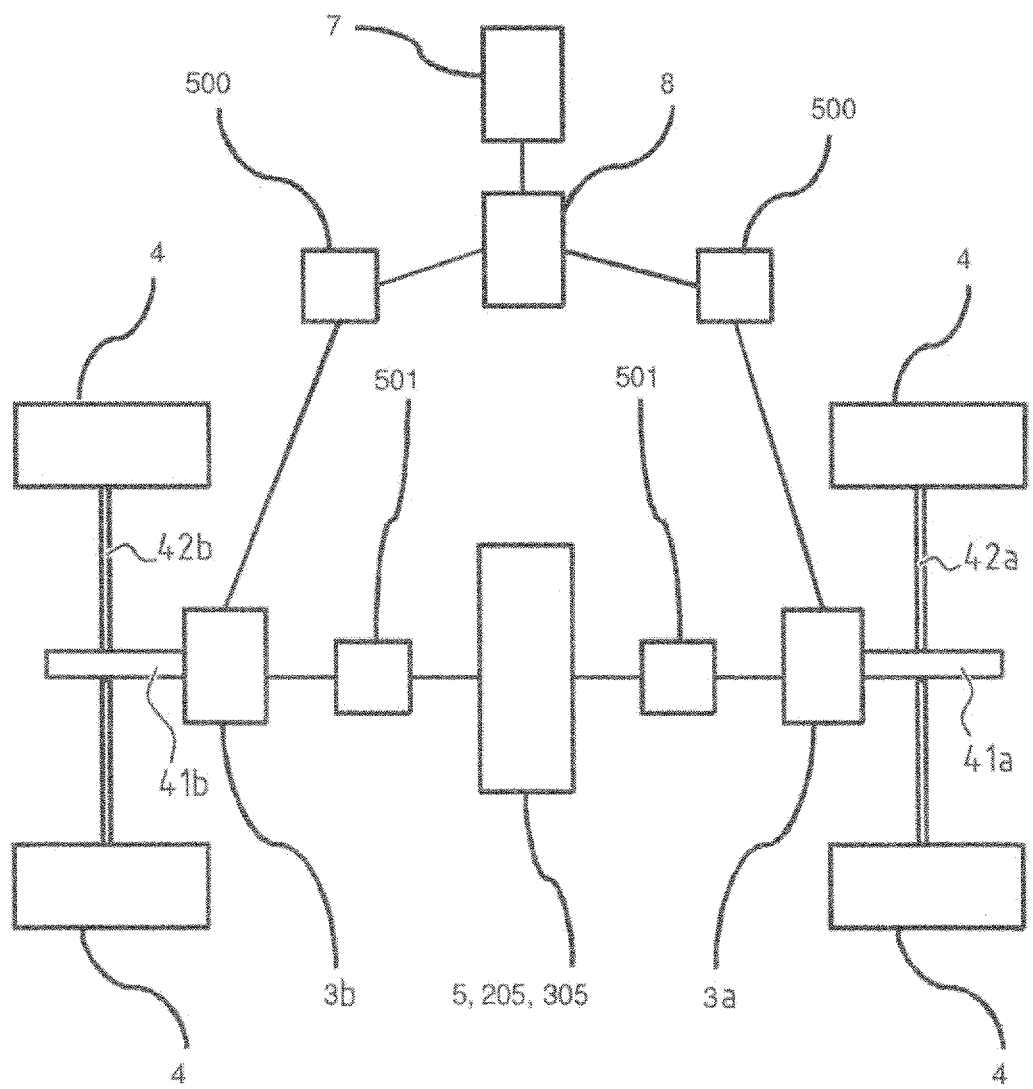

Shown for instance in FIG. 8 is that a rear electric motor 3a is provided which drives rear shaft 41a, which in turn drives the drive shafts 42a of rear wheels 4 via a suitable differential. The control of electric motor 3a again takes place via controller 500 and command system 8. Provided on the front side is a second electric motor 3b which drives front wheels 4 via front shaft 41b and drive shafts 42b. The front electric motor 3b is also coupled via its own controller 500 to command system 8 for the control thereof. The two motors 3a, 3b are coupled via inverters 501 to the same battery 5.

Figure 9:
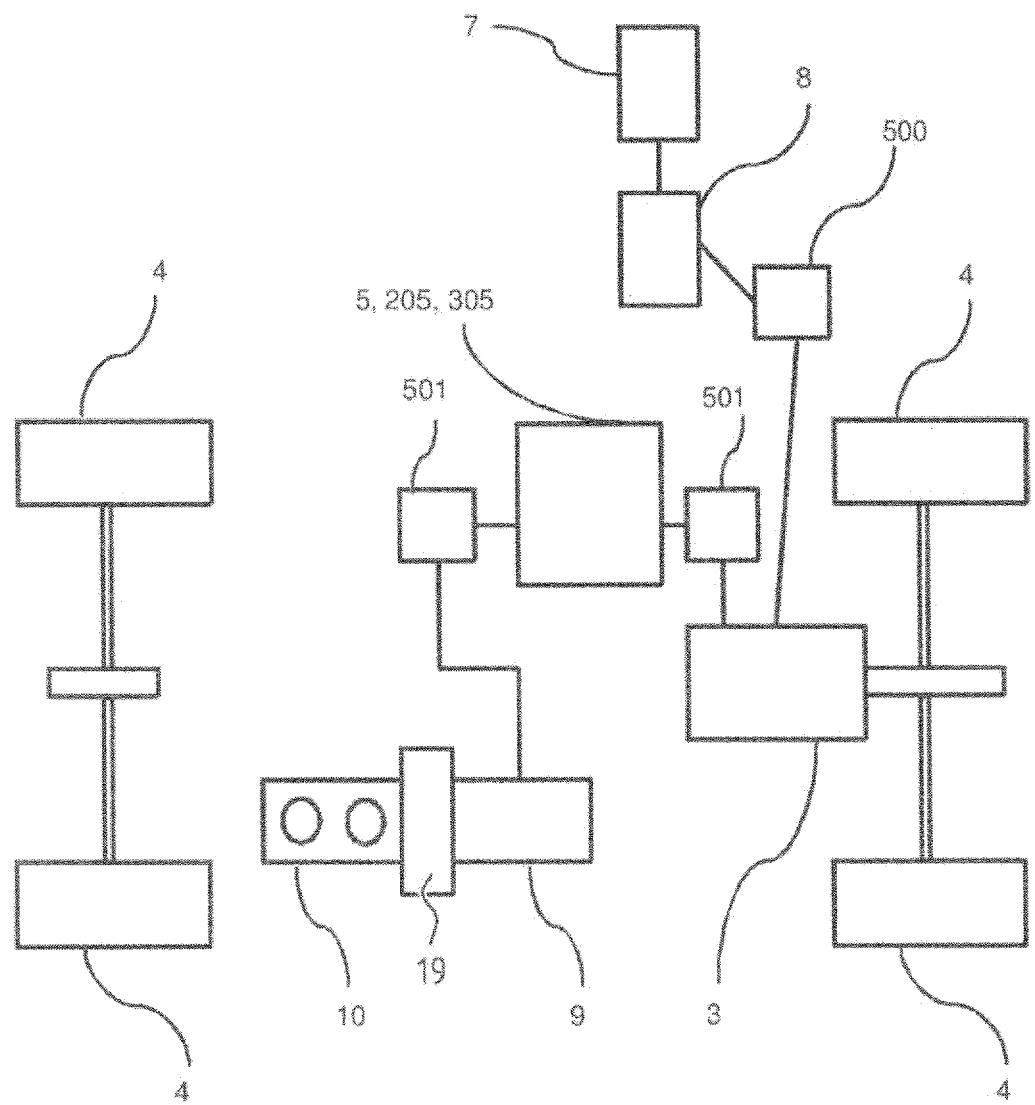

Provided in the embodiment of FIG. 9 for charging battery 5 is a combustion engine 10 which is coupled via a coupling 19 to a generator 9. It is possible for coupling 19 to be integrated into generator 9 or combustion engine 10. Generator 9 is coupled to battery 5 via an inverter 501. Since in this variant combustion engine 10 serves only for charging battery 5 and not for driving of for instance the displacing means, the combustion engine can run at an ideal, high-efficiency rotation speed, wherein generator 9 converts this movement into electrical energy which is supplied via inverter 501 to battery 5.

Figure 10:
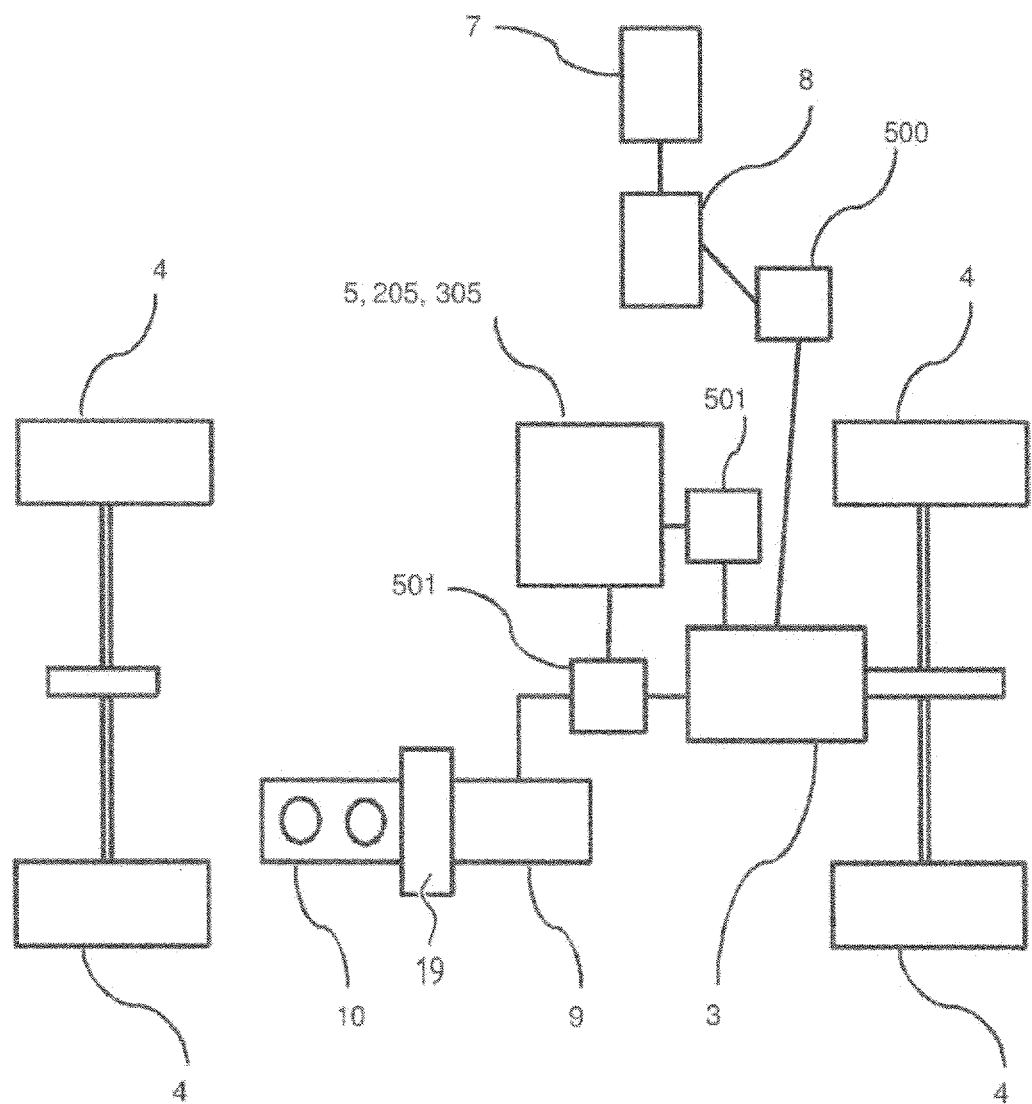

A variant is shown in FIG. 10. In this embodiment, generator 9 is also coupled via the optional inverter 501 to electric motor 3. This makes it possible for the electricity generated by combustion engine 10 to be supplied directly, i.e. without interposing battery 5, to electric motor 3.

Figure 11:
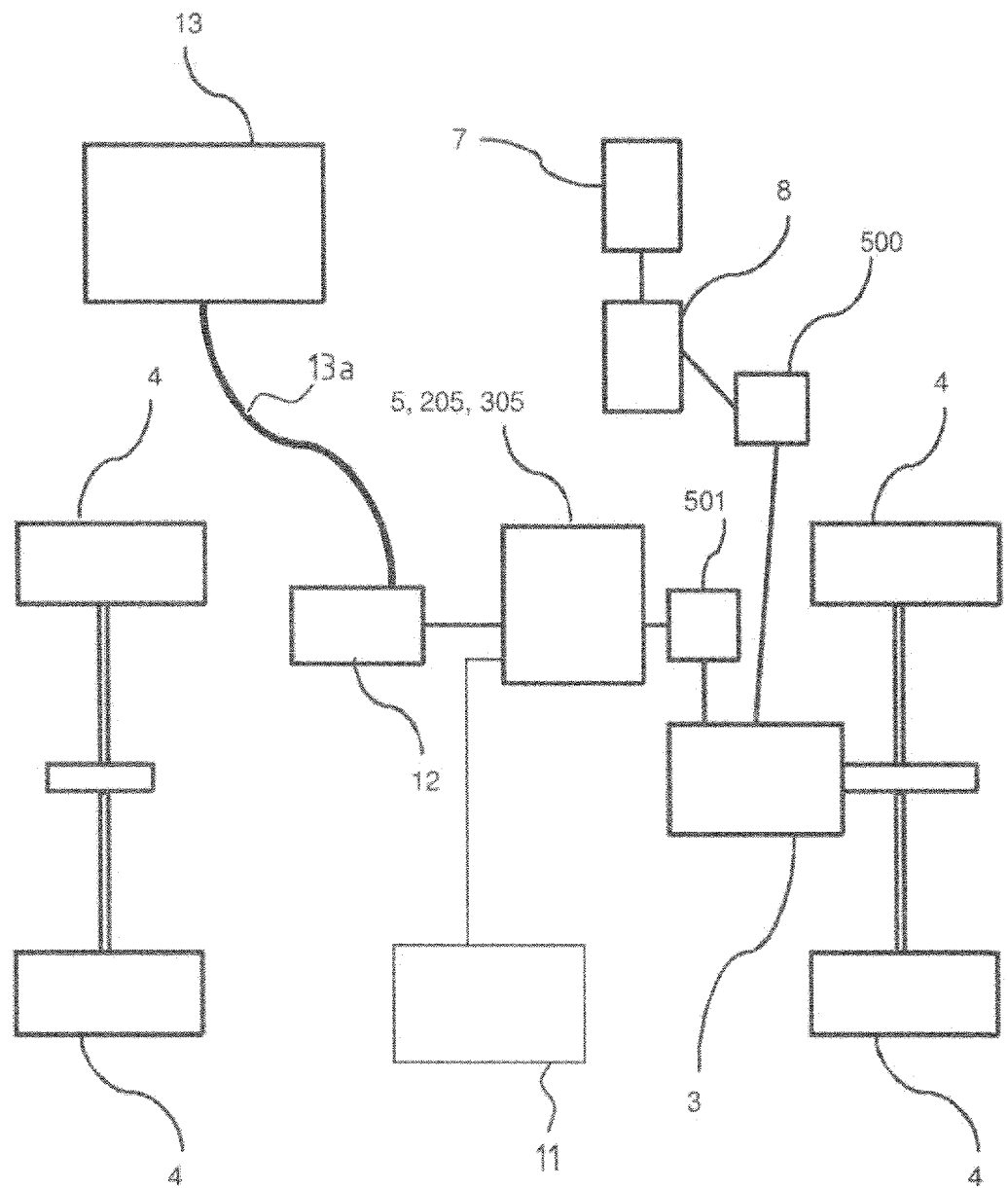

FIG. 11 shows other means for charging battery 5 which can be used as alternative to or in combination with the combustion engine. Battery 5 can thus be charged using a fuel cell 11 and/or battery 5 can be charged using a charger 12 which can be coupled with a releasable connector 13a to an external energy source 13, for instance a (high-voltage) wall socket in a garage.

Figure 12:
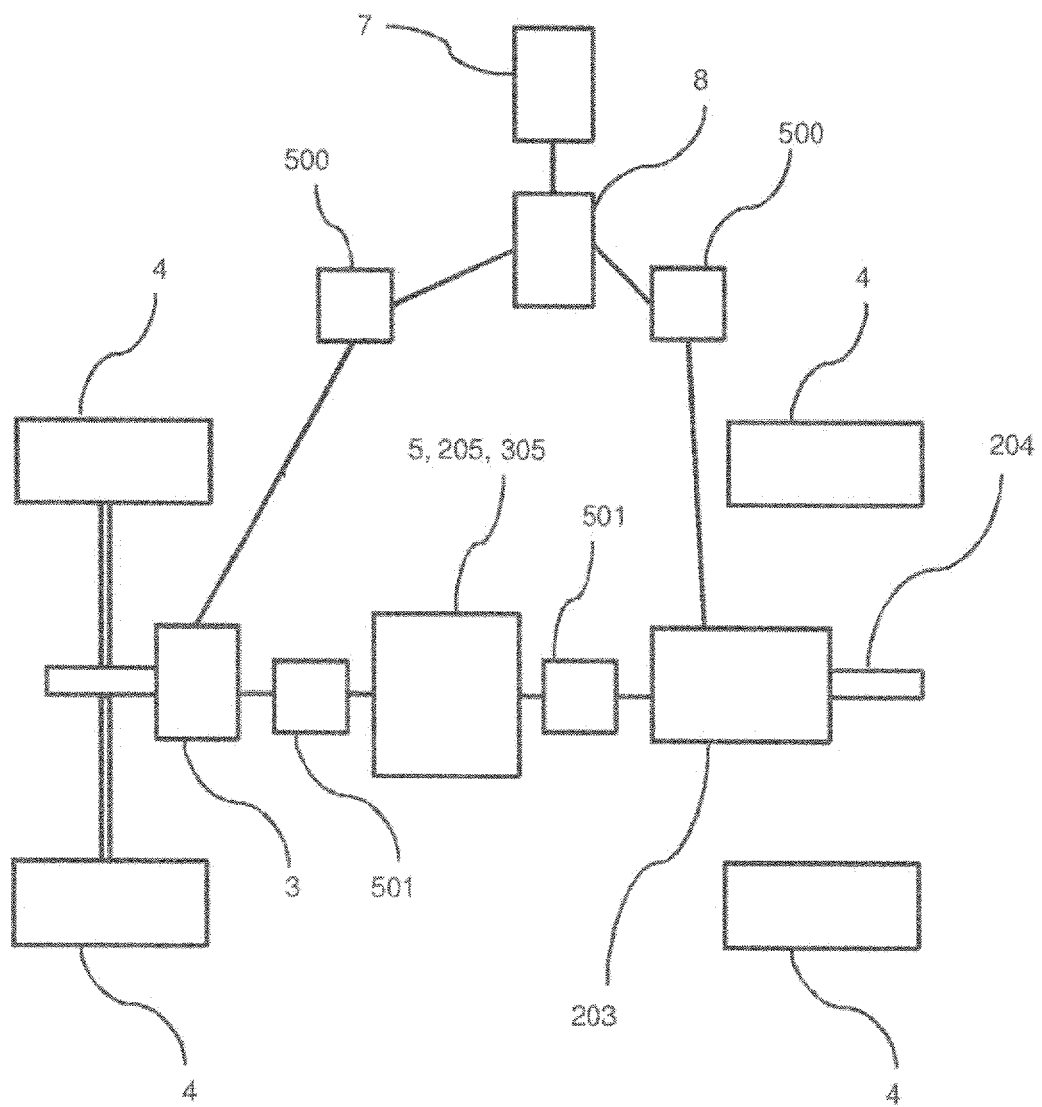
Figure 13:
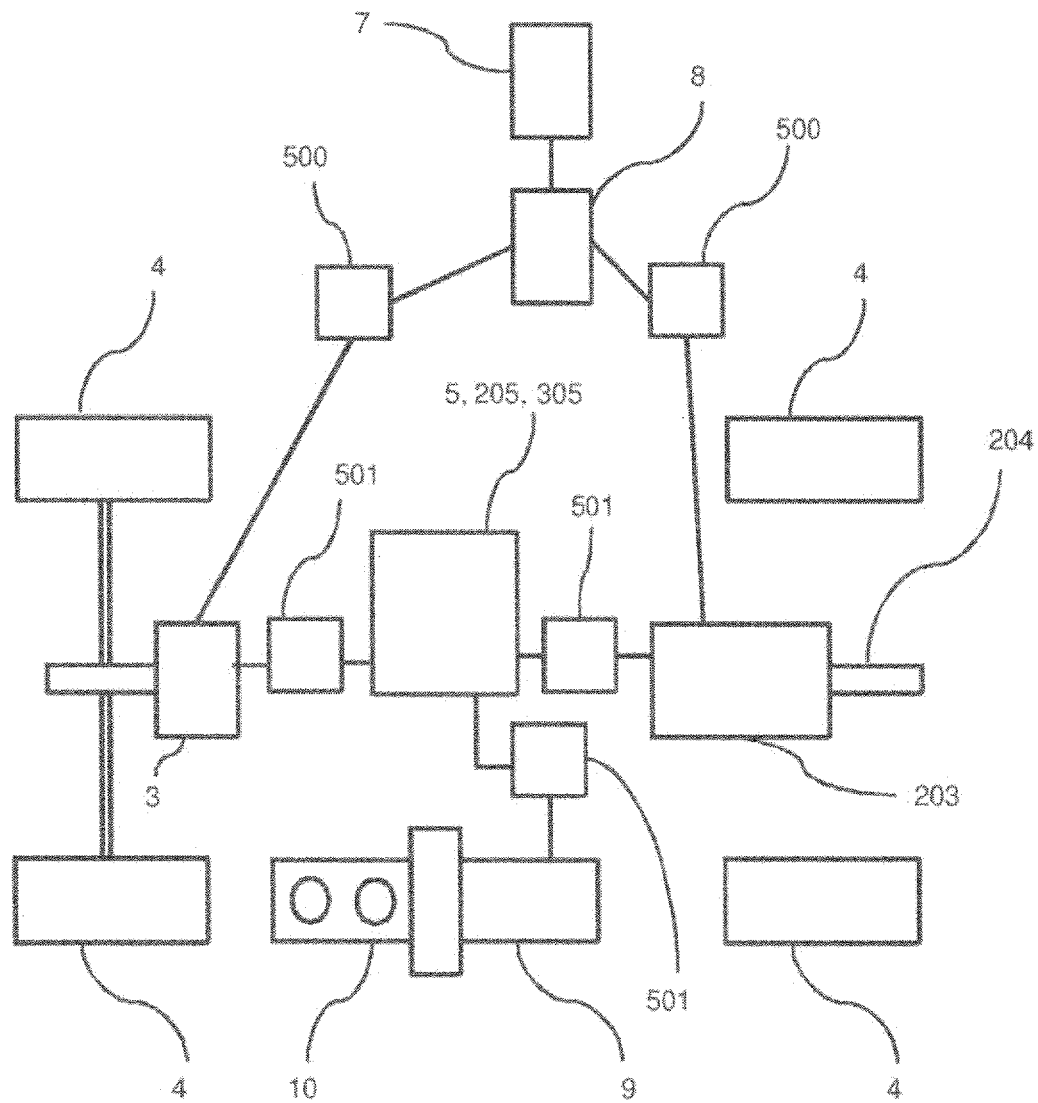
Figure 14:
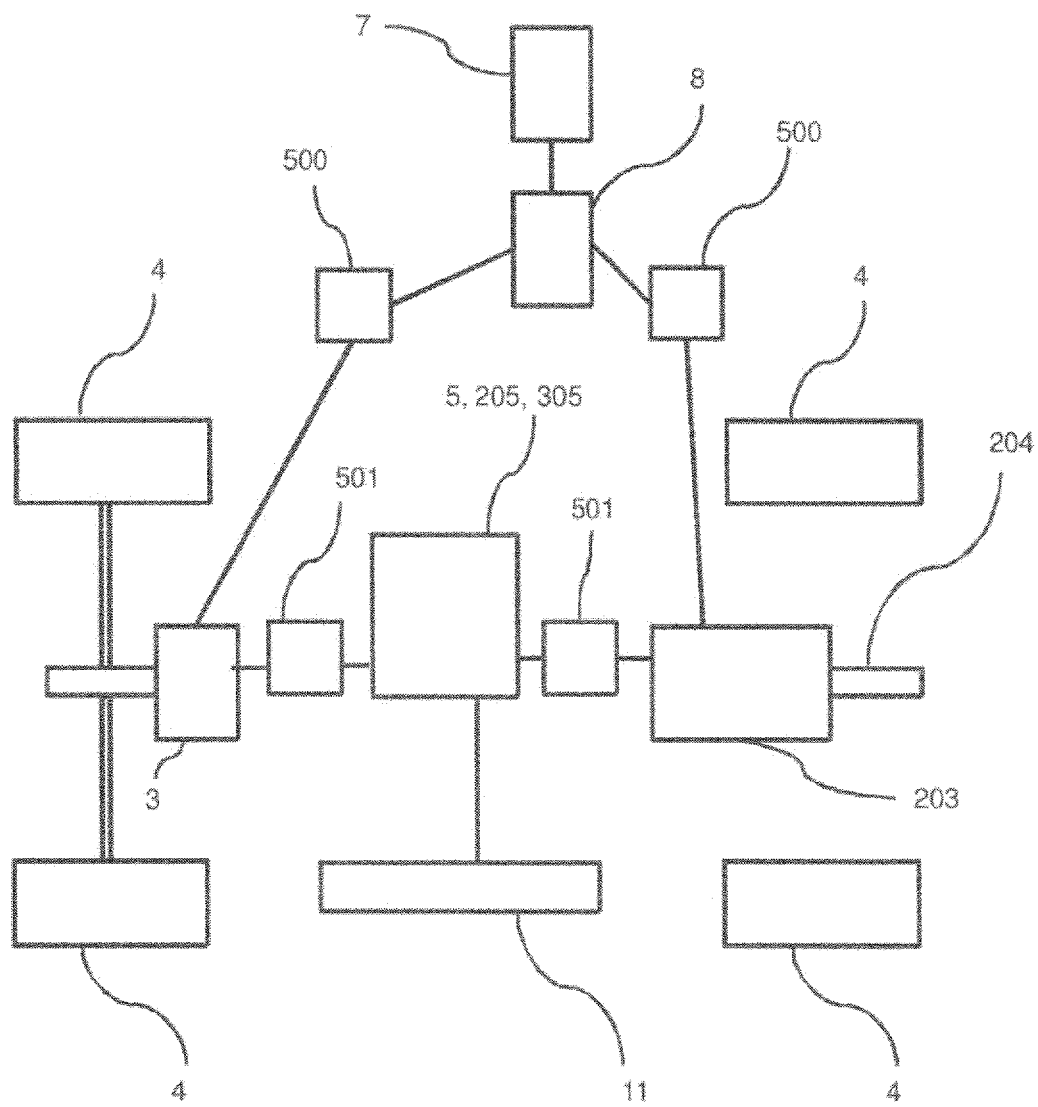

FIG. 12 shows an embodiment provided with a power takeoff shaft 204. This power takeoff shaft 204 is driven by an electric motor 203. Electric motor 203 for power takeoff shaft 204 is in turn coupled via a controller 500 to command system 8 for the control of the power takeoff shaft 204. The electricity for electric motor 203 for power takeoff shaft 204 is again supplied by battery 5 via an inverter 501. The same battery 5 also supplies energy to electric motor 3 for driving the wheels 4. It is once again possible in this variant for battery 5 to be provided with energy by combustion engine 10 via a generator 9 (FIG. 13) and/or using a fuel cell 11 (FIG. 14).

Figure 15:
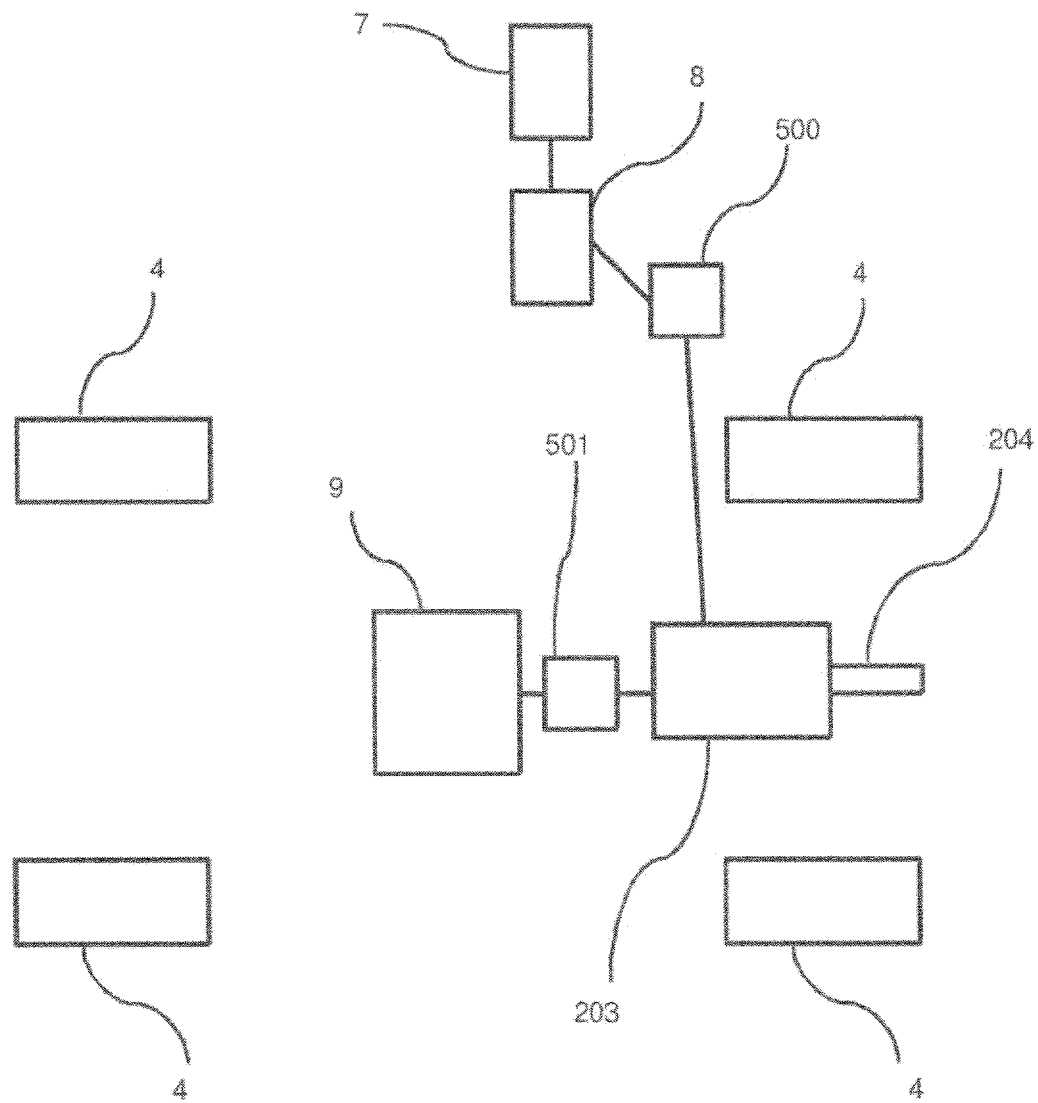
Figure 16:
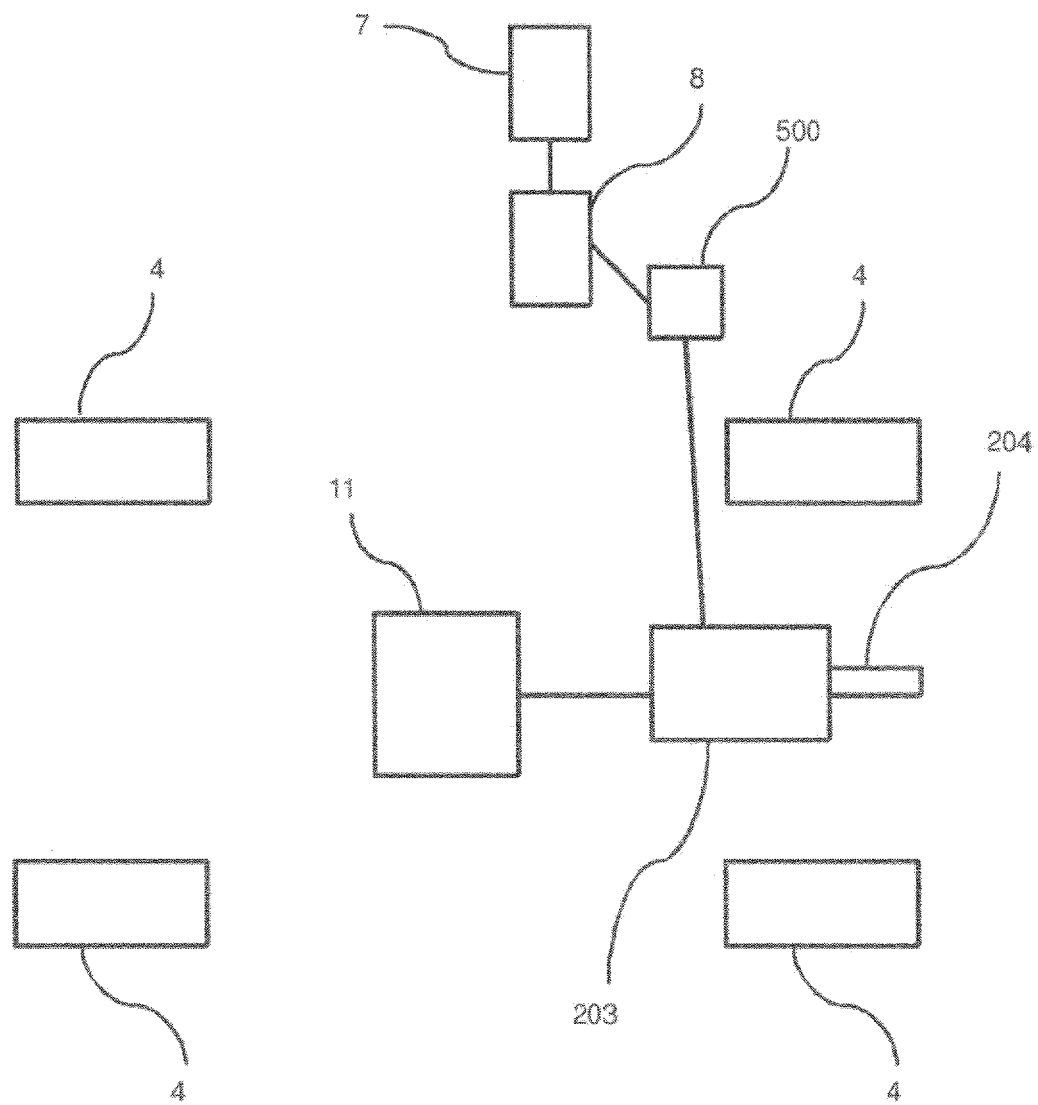

FIG. 15 shows the drive of power takeoff shaft 204 in isolation. In this embodiment electric motor 203 obtains energy via an inverter 501 coupled to a generator 9. Generator 9 here supplies electrical energy directly to electric motor 203. Generator 9 can be driven by a combustion engine (not shown). It is also possible for electric motor 203 to obtain energy directly from a fuel cell 11, see FIG. 16.

Figure 17:
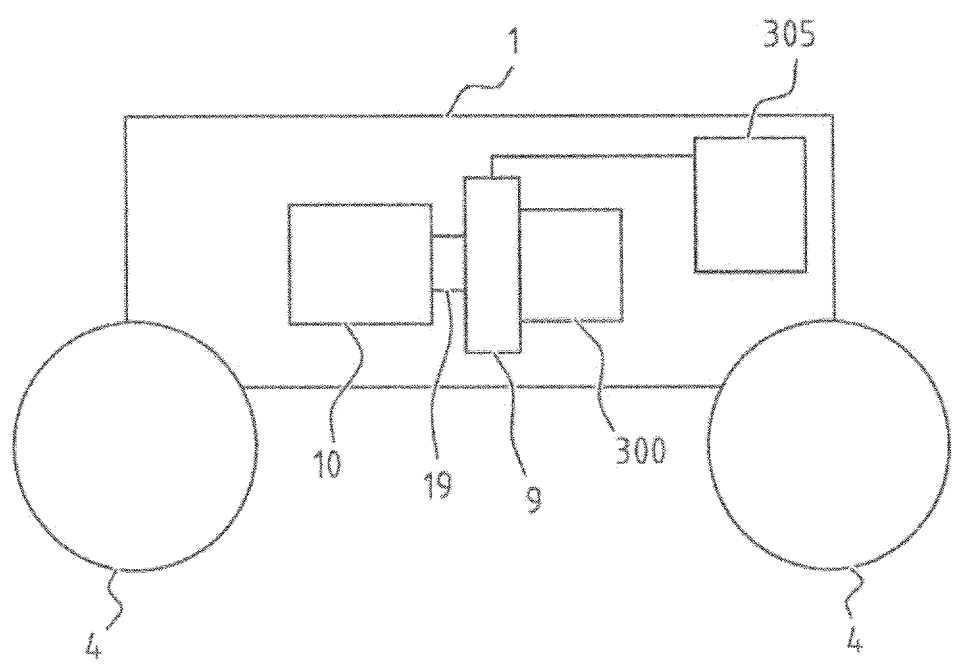
FIGS. 17-24 show schematic side and rear views of different embodiments of the invention.

FIG. 17 shows a hydraulic pump 300, for instance for driving the hydraulic operating arm 100. Hydraulic pump 300 is situated in this embodiment in main frame 1 and is connected via a generator 9 and coupling 19 to a combustion engine 10. Combustion engine 10 can here drive hydraulic pump 300 directly, wherein electrical energy is also generated by generator 9. This latter is connected for this purpose to a battery 305.

In an embodiment it is however also possible that generator 9 can also serve as electric motor, for instance in the case that combustion engine 10 is switched off. Coupling 19 can for this purpose disconnect combustion engine 10 from the generator 9 acting as electric motor. Generator 9 acting as electric motor obtains energy from a battery 305 coupled thereto.

Figure 18:
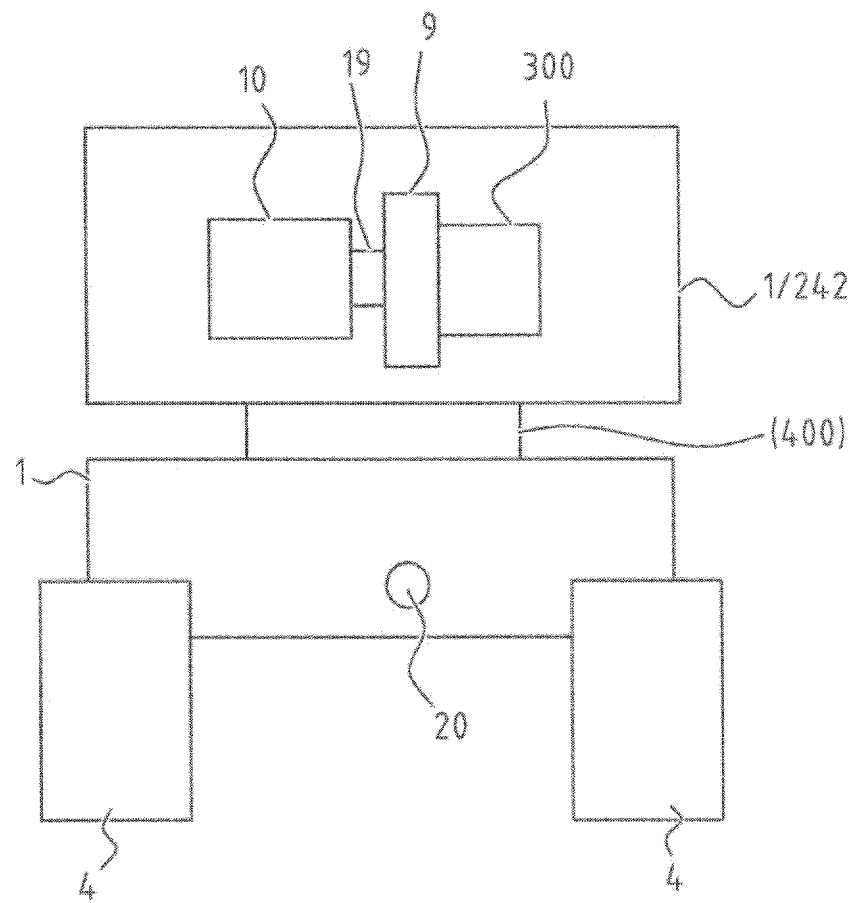

In the variant of FIG. 18 the combination of combustion engine 10, coupling 19, generator 9 and hydraulic pump 300 is arranged in rotatable sub-frame 2. This is particularly advantageous when operating arm 100 is also arranged on rotatable sub-frame 2. Also shown is that main frame 1 is provided with a coupling 20 for a charger. This is located on the rear side of main frame 1 so that it can be easily coupled to a power supply, which can for instance be placed in a trailer behind the mobile apparatus.

Figure 19:
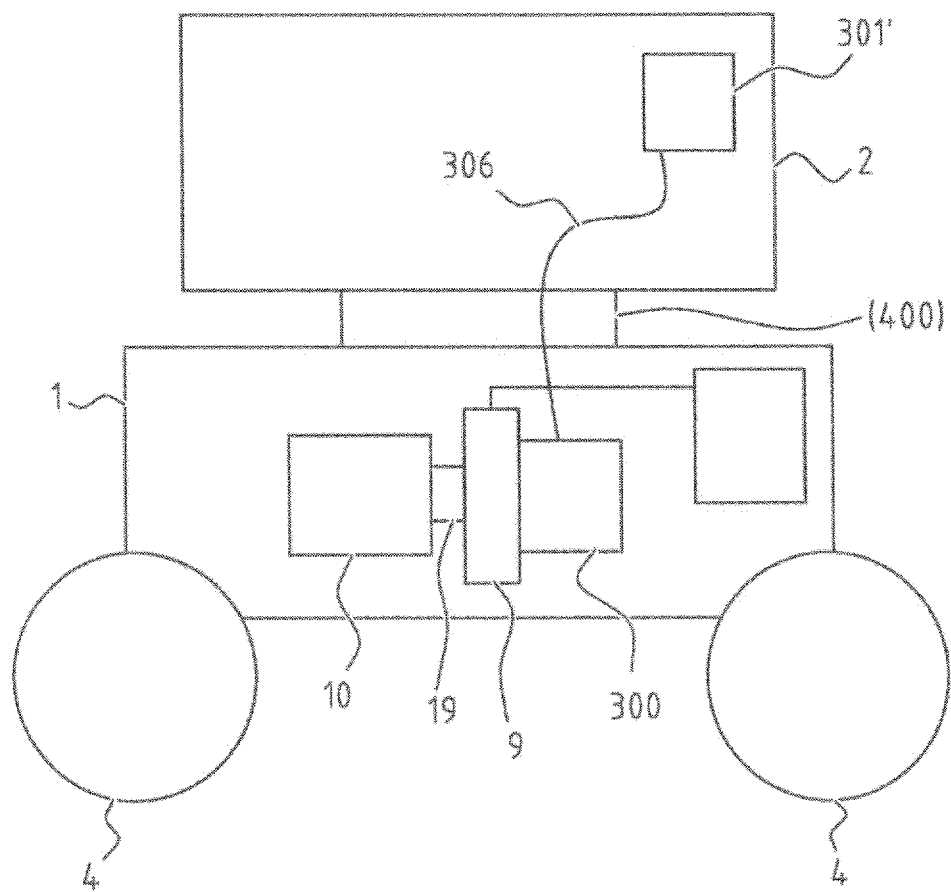
Figure 20:
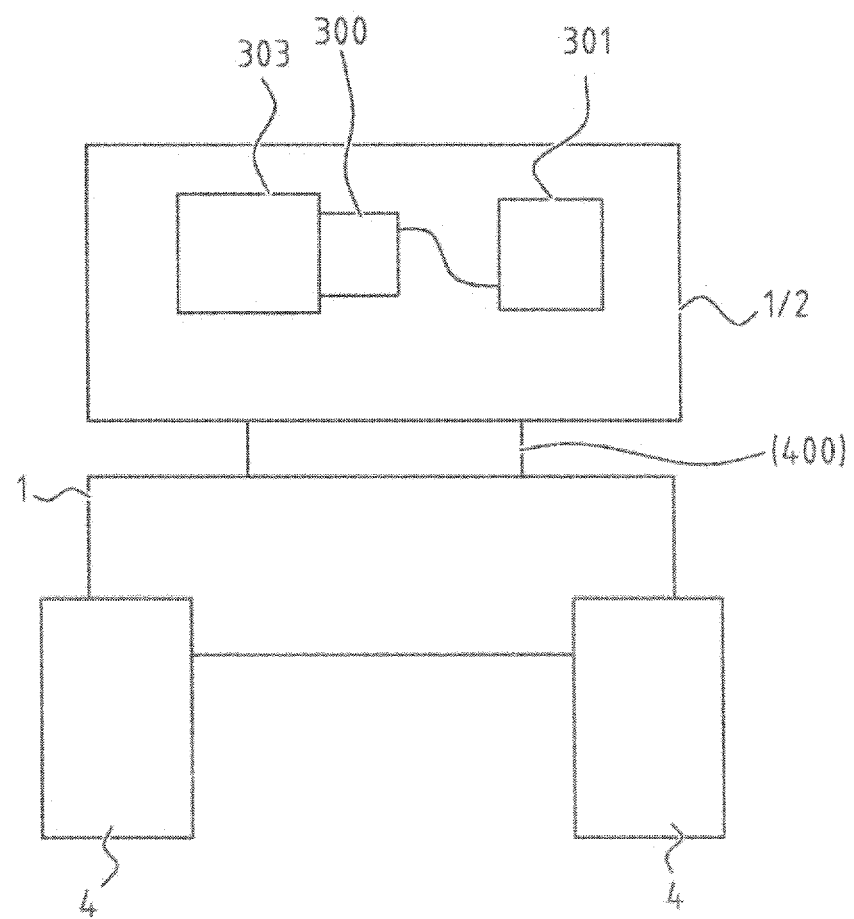

FIG. 19 shows that a single hydraulic pump 300 can be connected to a plurality of hydraulic valves 301 and 301' using suitable hydraulic conduits 306. One valve 301 is for instance situated in the main frame for coupling to an implement, while a second valve 301', for instance for an implement 101 on operating arm 100 or for operating arm 100 itself, is situated in sub-frame 2. The hydraulic conduit is then carried from hydraulic pump 300 in main frame 1 through slip ring 400 to valve 301' in sub-frame 2. It will be apparent that a plurality of valves can be provided.

Solely electrical driving of a hydraulic pump 300 is however also possible. An example hereof is shown in FIG.

20. A hydraulic pump 300 in sub-frame 2 is coupled here to an electric motor 303, which is in turn coupled to a suitable battery which is preferably also situated in sub-frame 2. Hydraulic pump 300 is coupled to a valve 301 arranged in sub-frame 2.

It will be apparent that each of the components for controlling, such as electric motors 300, 303 and/or valves 301, 301', are coupled in these embodiments to command system 8, for instance using suitable controllers 500 as also shown in the previous embodiments. The different components, for instance drive 3 of wheels 4, drive 203 of a power takeoff shaft 204 (FIG. 12) and drive 303 of hydraulic pump 300, can then he controlled using operating instruments 7 (see for instance, FIG. 6). It is then particularly advantageous for the different components for controlling to be provided with sensors for measuring the different operating parameters, such as for instance temperature, (hydraulic) pressure, (relative) positions of drive shafts, and so on. The different controllers 500 can then transmit these measurements to command system 8 so that the components can be controlled with feedback.

Figure 21:
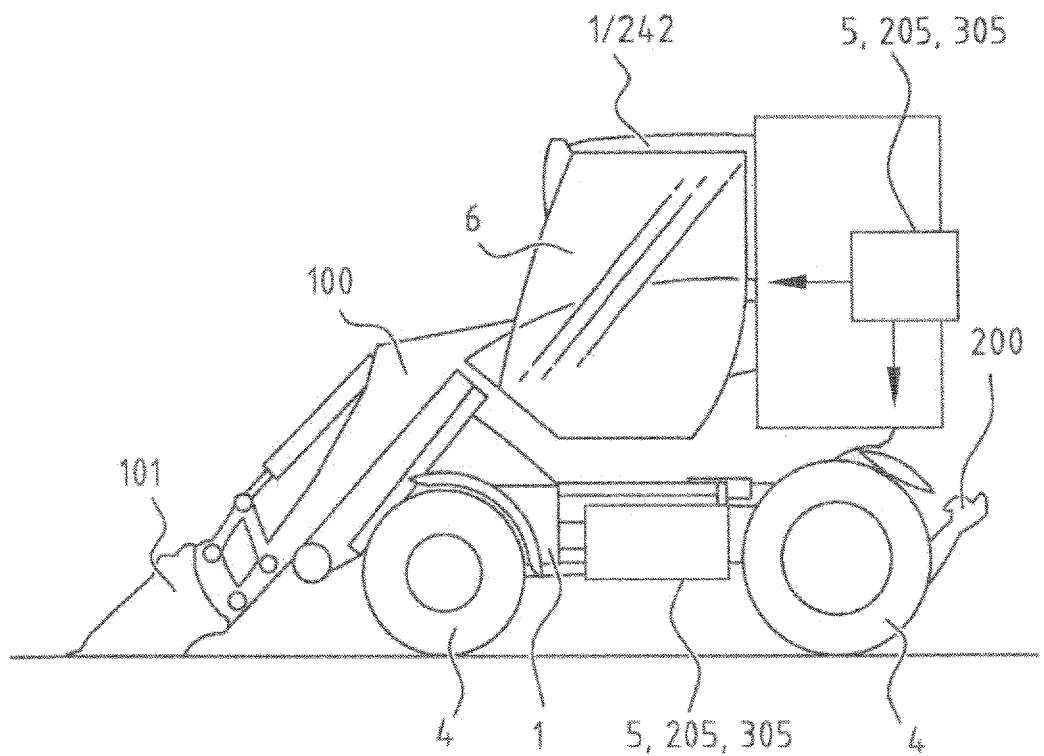

As stated, electric motors can be arranged both in main frame 1 and in sub-frame 2 for the purpose of driving different components. Batteries 5, 205, 305 which supply the energy for these electric motors can also be arranged in both main frame 1 and sub-frame 2. FIG. 21 shows for instance that a battery 5, 205, 305 is arranged on the underside of main frame 1, while a second battery 5, 205, 305 is arranged on the rear side of sub-frame 2. This battery 5, 205, 305 then at the same time serves as counterweight.

Figure 22:
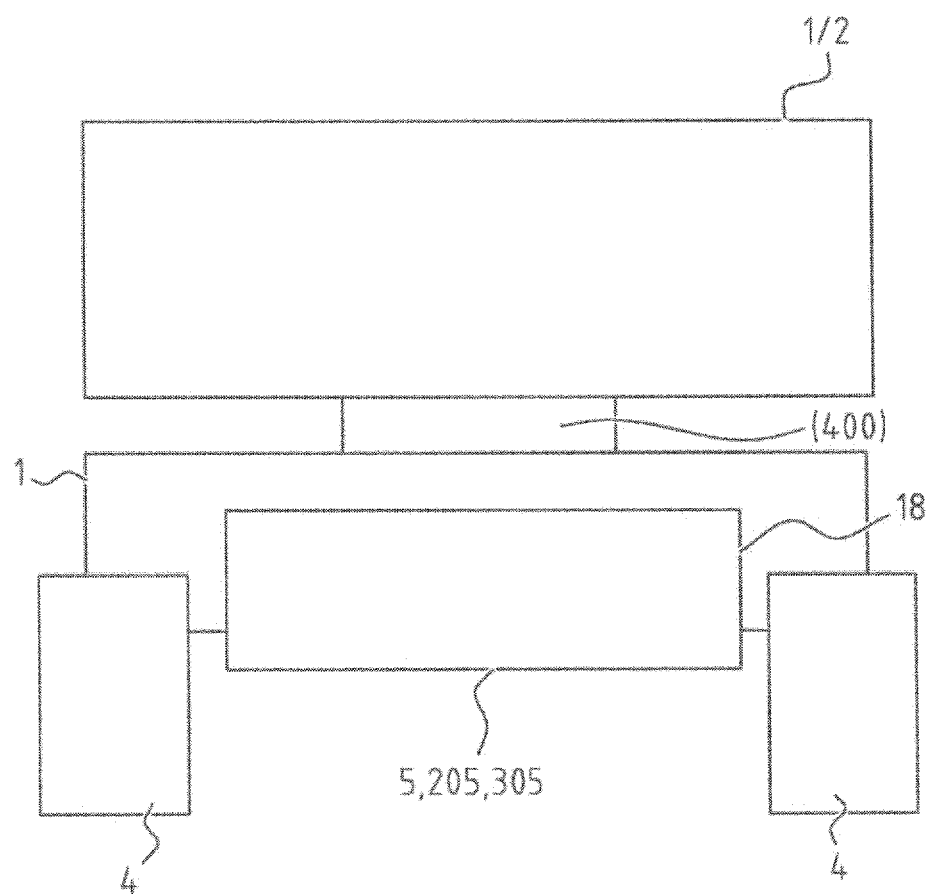
Figure 23:
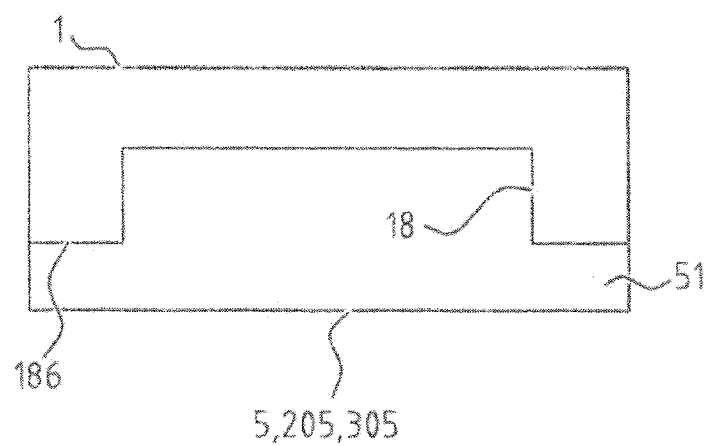
Figure 24:
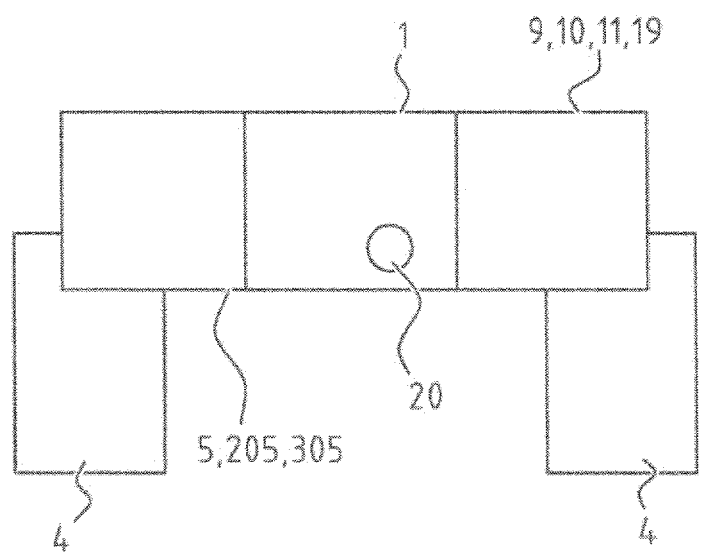

FIGS. 22, 23 and 24 show different variants of the placing of batteries 5, 205, 305 in main frame 1. In the embodiment of FIG. 22 the battery can for instance be received in a receiving space 18 in main frame 1. The dimensions of receiving space 18 in main frame 1 correspond to the dimensions of the battery 5, 205, 305 to be accommodated. Shown in FIG. 23 is a battery 5, 205, 305 which is provided with an edge part 51 which in connected situation abuts against the underside 1 8b of main frame 1. Shown in FIG. 24 is a construction wherein battery 5, 205, 305 is situated on the one side of main frame 1 while several other components, such as combustion engine 10, coupling 19, generator 9 and fuel cell 11, are located on the other side. The coupling of charger 20 is arranged more centrally.

COMPONENTS 1. main frame
2. sub-frame
3. electric motor for driving displacement
4. tyre(s) or caterpillar track(s)
5. energy storage
6. location driver
7. operating instruments
8. command system
9. generator
10. combustion engine
11. fuel cell
12. charger
13. energy source outside mobile apparatus
19. coupling
20. coupling of charger
100. operating arm
101. implement on operating arm
200. lifting device
201. implement on lifting device
202. stabilizing device
203. electric motor for drive of power takeoff shaft
204. power takeoff shaft
205. energy storage
300. hydraulic pump
301. hydraulic valve
303. electric motor for hydraulic pump
305. energy storage
400. rotary joint/slip ring
500. controller or ECU or I/O unit
501. inverter or a converter The present invention is not limited to the shown embodiments but also extends to other embodiments falling within the scope of the appended claims.

The invention claimed is:

1. A mobile apparatus comprising a main frame with a displacing means, a sub-frame arranged rotatably relative to the main frame, wherein the rotatable sub-frame comprises an operating arm connected to the sub-frame, a first drive configured to drive the displacing means, a second drive configured to drive the operating arm, and a control system, wherein the first drive comprises at least one electric motor such that the first drive is electrical;
   wherein the second drive comprises at least one of an electric motor and an electric actuator; said mobile apparatus further comprising at least one energy storage unit for storing and supplying electrical energy to the at least one of the first drive and the second drive; wherein the at least one energy storage unit is coupled to a side, an underside, a front, a rear; or is positioned in a receiving space of the main frame; and further comprising operating instruments coupled to a computing unit; wherein the computing unit is configured to compute the extent to which a plurality of electrical drives is controlled via the control system, wherein at least one of the first drive and the second drive is provided with a sensor for detecting the status of the drive, wherein the computing unit is configured to control at least one drive on the basis of the input of the sensor and the operating instruments and wherein the control system is configured to distribute the available electrical energy over the plurality of drives.

2. The mobile apparatus as claimed in claim 1, wherein the first drive comprises at least two electric motors.

3. The mobile apparatus as claimed in claim 1, wherein the displacing means comprise a front displacing means and a rear displacing means; and wherein the first drive comprises at least a first and a second electric motor, wherein the first electric motor drives the front displacing means and the second electric motor drives the rear displacing means.

4. The mobile apparatus as claimed in claim 1, wherein the first drive and the second drive comprise substantially identical electric motors.

5. The mobile apparatus as claimed in claim 1, wherein a drive for the rotation of the sub-frame relative to the main frame, and/or for the steering and/or for braking comprises at least one of an electric motor and an electric actuator.

6. The mobile apparatus as claimed in claim 1, wherein the first drive comprises an energy recovery system configured to recover energy while braking.

7. The mobile apparatus as claimed in claim 1, further comprising a lifting device or stabilizer on the main frame, and an electric motor or electric actuator for the lifting device or stabilizer.

8. The mobile apparatus as claimed in claim 1, wherein the at least one energy storage unit is a battery or a capacitor.

9. The mobile apparatus as claimed in claim 1, further comprising a combustion engine, a generator or a fuel cell configured for supplying energy to the at least one energy storage unit or to at least one of the first and the second drive; wherein said combustion engine or generator or fuel cell is arranged in the main fame or in the sub-frame.

10. The mobile apparatus as claimed in claim 1, wherein the control system comprises a remote control system configured to transfer driver commands via a data transmitter for the purpose of controlling the mobile apparatus, and particularly controlling one or more electric motors at least one of the first and the second drive.

11. The mobile apparatus as claimed in claim 1, further comprising at least one further energy storage unit for storing and supplying electrical energy to at least one of the first drive and the second drive, said at least one further energy storing unit being positioned in or to a side of the sub-frame.

12. A mobile apparatus comprising a main frame with displacing means, a sub-frame arranged rotatably relative to the main frame, an operating arm connected to the sub-frame, a first drive configured to drive the displacing means, a second drive configured to drive the operating arm, and a control system wherein at least one of the first drive and the second drive comprises at least one of an electric motor and an electric actuator; said mobile apparatus further comprising at least one energy storage unit for storing and supplying electrical energy to the at least one of the electric motor and the electric actuator, wherein the at least one energy storage unit is configured to also supply electrical energy to at least one of an electrically driven implement connected to the operating arm; further comprising operating instruments coupled to a computing unit; wherein the computing unit is configured to compute the extent to which a plurality of electrical drives is controlled via the control system, wherein at least one of the first drive and the second drive is provided with a sensor for detecting the status of the drive, wherein the computing unit is configured to control at least one drive on the basis of the input of the sensor and the operating instruments and wherein the control system is configured to distribute the available electrical energy over the plurality of drives.

13. The mobile apparatus as claimed in claim 12, wherein the at least one energy storage unit is a battery or a capacitor.

14. The mobile apparatus as claimed in claim 12, further comprising a combustion engine, a generator or a fuel cell configured for supplying energy to the at least one energy storage unit or to at least one of the first drive and the second drive; wherein said combustion engine or generator or fuel cell is arranged in the main fame or in the sub-frame.

15. The mobile apparatus as claimed in claim 12, further comprising operating instruments coupled to the control system, said control system being configured for controlling the electrical driving of the implement.

16. The mobile apparatus as claimed in claim 12, wherein a drive for the rotation of the sub-frame relative to the main frame, and/or for the steering and/or for braking comprises an electric motor or an electric actuator.

17. The mobile apparatus as claimed in claim 12, wherein the at least one energy storage unit is arranged in the main frame.

18. A mobile apparatus in combination with an energy source pulled along by the mobile apparatus, said mobile apparatus comprising a main frame with displacing means, a sub-frame arranged rotatably relative to the main frame, an operating arm connected to the sub-frame, a first drive configured to drive the displacing means, a second drive configured to drive the operating arm, and a control system, wherein at least one of the first drive and the second drive comprises at least one of an electric motor and an electric actuator; said mobile apparatus further comprising at least one energy storage unit for storing and supplying electrical energy to the at least one of the electric motor and the electric actuator, wherein the at least one electrical energy storage unit is configured to be charged by the energy source connected and pulled along by the mobile apparatus.

19. The combination as claimed in claim 18, wherein a connector between the energy source and the mobile apparatus is positioned at a side of the main frame or sub-frame.

* * * * *